(12) United States Patent
Ueno et al.

(10) Patent No.: US 7,591,204 B2
(45) Date of Patent: Sep. 22, 2009

(54) BELT SPEED REDUCING APPARATUS FOR ELECTRIC POWER STEERING APPARATUS AND ELECTRIC POWER STEERING APPARATUS

(75) Inventors: Seiji Ueno, Gunma (JP); Kazuo Chikaraishi, Gunma (JP)

(73) Assignees: NSK Ltd., Tokyo (JP); NSK Steering Systems Co., Ltd., Tokyo (JP)

( * ) Notice: Subject to any disclaimer, the term of this patent is extended or adjusted under 35 U.S.C. 154(b) by 780 days.

(21) Appl. No.: 10/960,063

(22) Filed: Oct. 8, 2004

(65) Prior Publication Data

US 2005/0121251 A1    Jun. 9, 2005

Related U.S. Application Data

(63) Continuation-in-part of application No. PCT/JP2004/006079, filed on Apr. 27, 2004.

(30) Foreign Application Priority Data

| May 6, 2003 | (JP) | ............ P.2003-128260 |
| Jun. 13, 2003 | (JP) | ............ P.2003-170119 |
| Jun. 19, 2003 | (JP) | ............ P.2003-174776 |

(51) Int. Cl.
*F16H 35/00* (2006.01)

(52) U.S. Cl. ................................ 74/388 PS

(58) Field of Classification Search ............. 74/388 PS, 74/424.71; 180/444
See application file for complete search history.

(56) References Cited

U.S. PATENT DOCUMENTS

| 6,086,499 | A | * | 7/2000 | Brandsma | .................... 474/201 |
| 6,938,722 | B2 | * | 9/2005 | Sasaki et al. | .................... 180/444 |
| 6,960,145 | B2 | * | 11/2005 | Fraley et al. | .................... 474/134 |
| 7,278,334 | B2 | * | 10/2007 | Saruwatari et al. | ....... 74/388 PS |
| 2003/0221896 | A1 | | 12/2003 | Sasaki et al. | |
| 2004/0095016 | A1 | | 5/2004 | Bayer et al. | |
| 2004/0104067 | A1 | | 6/2004 | Fishbach et al. | |
| 2004/0221668 | A1 | * | 11/2004 | Saruwatari et al. | ....... 74/388 PS |
| 2007/0066431 | A1 | * | 3/2007 | Hironaka | .................... 474/205 |

FOREIGN PATENT DOCUMENTS

| DE | 26 15 338 B1 | 7/1977 |
| DE | 100 52 275 A1 | 5/2002 |
| DE | 103 04 189 A1 | 9/2003 |
| FR | 2 686 959 A1 | 8/1993 |
| FR | 2686959 A1 * | 8/1993 |
| FR | 2 853 876 A1 | 10/2004 |
| JP | 33475/1972 U | 5/1972 |
| JP | 53-25767 A | 3/1978 |
| JP | 53-102195 A | 8/1978 |
| JP | 60/122274 U | 8/1985 |
| JP | 61-112148 U | 7/1986 |
| JP | 62-4673 A | 1/1987 |

(Continued)

*Primary Examiner*—Vicky A Johnson
(74) *Attorney, Agent, or Firm*—Sughrue Mion, PLLC

(57) ABSTRACT

A belt speed reducing apparatus for an electric power steering apparatus includes a drive pulley having a first helical gear, a driven pulley having a second helical gear and a drive belt having a third helical gear in which a relationship of $\tan \beta < \mu$ is established between a twist angle $\beta$ of the respective helical gears and a friction coefficient $\mu$ between the first or the second helical gear and the third helical gear. Further, an electric power steering apparatus for adjusting a backlash between gears of a speed reducing apparatus brought in mesh with each other or adjusting a tension of a belt of a speed reducing apparatus.

6 Claims, 29 Drawing Sheets

FOREIGN PATENT DOCUMENTS

| | | |
|---|---|---|
| JP | 62/127867 U | 8/1987 |
| JP | 1-145268 A | 6/1989 |
| JP | 3-56748 A | 3/1991 |
| JP | 6-49489 Y2 | 12/1994 |
| JP | 7-127698 A | 5/1995 |
| JP | 7-293647 A | 11/1995 |
| JP | 8-28669 A | 2/1996 |
| JP | 8-334031 A | 12/1996 |
| JP | 10-297505 A | 11/1998 |
| JP | 11-13840 A | 1/1999 |
| JP | 11-34888 A | 2/1999 |
| JP | 2000-168593 A | 6/2000 |
| JP | 2000-190855 A | 7/2000 |
| JP | 2000-250279 A | 9/2000 |
| JP | 2001-159449 A | 6/2001 |
| JP | 2001-206231 A | 7/2001 |
| JP | 2001-271913 A | 10/2001 |
| JP | 2002-274397 A | 9/2002 |
| JP | 2003-2220 A | 1/2003 |
| JP | 2003-220958 A | 8/2003 |
| JP | 2003-220959 A | 8/2003 |
| JP | 2004-050884 A | 2/2004 |
| JP | 2004-523421 A | 8/2004 |
| JP | 2004-314770 A | 11/2004 |
| JP | 2005-22634 A | 1/2005 |
| WO | 01/15959 A1 | 3/2001 |

* cited by examiner

BELT SPEED REDUCING APPARATUS FOR ELECTRIC POWER STEERING APPARATUS AND ELECTRIC POWER STEERING APPARATUS

CROSS-REFERENCE TO RELATED APPLICATION

This is a continuation-in-part application of PCT/JP2004/006079 filed on Apr. 27, 2004

BACKGROUND OF THE INVENTION

1. Field of the Invention

The present invention relates to a belt speed reducing apparatus for an electric power steering apparatus and an electric power steering apparatus.

2. Description of the Related Art

There is known an electric power steering apparatus for a vehicle for reducing a speed of a rotational output of a motor via a speed reducing mechanism to assist steering operation as a steering assisting force.

For example, in an electric power steering apparatus 500 shown in FIG. 41, a steering shaft 501 and a rack shaft 502 are brought in mesh with each other by a publicly-known pinion rack mechanism 503. Further, a motor shaft 505 of a motor 504 is rotatably supported by bearings 506, 507.

The rack shaft 502 is formed with a male screw portion (spiral groove) 508. A nut 510 rotatably supported by a bearing 509 is arranged on an outer side thereof. A ball 511 is inserted to fit between the mail screw portion 508 of the rack shaft 502 and the nut 510 to thereby constitute a ball screw mechanism 512.

A shaft 515 of an input gear 514 is coupled with an extended portion 513 of the motor shaft 505 by a spline coupling SP. The input gear 514 is brought in mesh with a middle gear 516 and the middle gear 516 is brought in mesh with an output gear 517. The output gear 517 is formed in a cylindrical shape and penetrated with the rack shaft 502 at inside thereof. Further, outer sides of both end portions in an axial direction of the output gear 517 are rotatably supported by bearings 518, 519, and a spline groove 520 is formed at an inner face in the cylindrical shape of the output gear 517.

Meanwhile, a spline projected streak 522 is formed at an outer side of an extended portion 521 at one end of the nut 510 of the ball screw mechanism 512 to couple with the spline groove 520 formed at the inner face of the output gear 517 by spline coupling SP.

In the above-described constitution, based on a steering torque of the steering shaft 501 detected by a torque detecting apparatus, not illustrated, a driving rotational force of the motor 504 driven by a control apparatus, not illustrated, is transmitted to the nut 510 of the ball screw mechanism 512 via the input gear 514, the middle gear 516, and the output gear 517. Further, the rack shaft 502 is moved in an axial direction by rotating the nut 510 to change a direction of a wheel to thereby carry out steering.

In a constitution of using the above-described gear speed reducing mechanism as a speed reducing mechanism, when a backlash of a mesh portion of the gear is large, there is brought about a drawback that when steering operation is reverted or the like, teeth striking sound is emitted at tooth faces. Further, when the backlash is excessively small, there is brought about a drawback that meshed rotating operation of the gear is not carried out smoothly and a steering feeling is deteriorated or the like. Therefore, it becomes necessary to set a magnitude of the backlash in a pertinent range.

For example, in a well-known worm gear speed reducing mechanism constituted by a worm and a worm wheel, as described in JP-A-10-297505 (hereafter, described as "Patent Reference 1"), there is proposed a constitution in which a housing of a worm gear speed reducing mechanism is divided into a housing on a side of a worm and a housing on a side of a worm wheel and a magnitude of a backlash is set in a pertinent range by adjusting an interval between the two housings.

Other than the above-described, in order to set a magnitude of a backlash in a pertinent range, there is a case in which a working dimensional accuracy in fabricating a gear is promoted, or a method referred to as matching of selecting a gear on a counterpart to be meshed in accordance with a state of a finish dimension of a fabricated gear or the like, however, these methods result in increasing fabrication cost, which is not preferable.

According to the electric power steering apparatus 500 having a constitution explained in reference to FIG. 41, the motor shaft 505 is arranged in parallel with the rack shaft 502, and in order to avoid interference between the motor 504 and the rack shaft 502, a distance between axis centers of the input gear 514 and the output gear 517 is constituted to be large. Thus, the input gear 514 and the output gear 517 are constituted to be brought in mesh with each other via the middle gear 516.

When the middle gear 516 is interposed in the gear speed reducing mechanism, a backlash between the input gear 514 and the middle gear 516 and a backlash between the input gear 516 and the output gear 517 need to adjust. However, when the gear is selected to determine by the above-described matching, the matching is carried out between the input gear 514 and the middle gear 516 and between the middle gear 516 and the output gear 517, which is much difficult to carry out.

Further, when a worm gear speed reducing mechanism is used, particularly in a constitution of using a saddle type worm as a worm, a three needles measuring method which is carried out in a normal worm cannot be used in measuring a finish dimension of the saddle type worm. Thus, it is very difficult to measure the dimension of the worm and therefore, matching is carried out in operation of integrating the speed reducing mechanism and there is brought about a drawback that a number of integrating steps is increased.

Further, according to a belt speed reducing apparatus constituted by an input pulley and an output pulley in place of the above-described input gear and output gear and a drive belt made to wrap on the pulleys, in order to maintain high transmitting efficiency and durability, it is requested to set a tension of the drive belt in a pertinent range, however, a dispersion among products of the drive belt is larger than that of the gear. Therefore, it is necessary to construct a constitution capable of easily adjusting a distance between axis centers of the input pulley and the output pulley.

Other than these, an electric power steering apparatus is constituted by a structure of integrating a motor to a housing of apparatus at a later stage and therefore, a motor shaft and a gear or a pulley are constituted by separate members. Thus, it is necessary to provide bearings to a motor shaft and a gear shaft or a pulley shaft and there is a drawback of increasing a number of parts and increasing fabrication cost.

Further, as a constitution of using a belt speed reducing apparatus, for example, according to JP-A-62-004673 (hereafter, referred to as "Patent Reference 2"), there is known a constitution of using a V belt of a friction type. Further, according to JP-UM-A-06-049489 (hereafter, described as "Patent Reference 3"), there is known a constitution of using a spur gear type belt (timing belt).

According to the belt speed reducing apparatus using the V belt described in Patent Reference 2, power is transmitted by friction and therefore, a large tension must be exerted to the belt in order to achieve the friction force. Therefore, a torque under no load is increased and therefore, there is a drawback that return of a steering wheel is increased. In contrast thereto, according to the belt speed reducing apparatus using the spur gear type belt described in Patent Reference 3, owing to a mesh transmitting type, a large tension is not needed and therefore, there is achieved an advantage of capable of reducing the no load torque. However, according to the spur gear type belt, particular operating sound is emitted in starting and in finishing engaging teeth on a side of the pulley and teeth on a side of the belt accompanied by rotation.

Although the problem can be resolved to some degree by reducing a size of the teeth of the belt, on the other hand, the teeth are weakened. Therefore, when a large force is exerted, there may be brought about a serious problem starting from shearing of the teeth, biting of the sheared teeth, locking of the speed reducing mechanism and finally, a progress to a state of being unable to carry out steering. Therefore, when the size of the teeth of the belt is reduced with an object of reducing the operating sound, it is necessary to widen a width of the belt, the speed reducing mechanism is large-sized unavoidably and therefore, layout of the speed reducing mechanism in a vehicle body becomes difficult.

Further, according to the electric power steering apparatus using the belt speed reducing apparatus, the tension exerted to the belt significantly controls a function of the electric power steering apparatus. In the case of the V belt of the friction type, when the tension is excessively larger than a proper value, an operating torque (friction under no load) is increased, return of the steering wheel is deteriorated and therefore, an adverse influence is effected on the steering wheeling. Conversely, when the tension is excessively smaller than the proper value, in the case of the V belt of the friction type, the friction force becomes deficient, slip is produced and therefore, power cannot be transmitted. Further, in the case of the spur gear type belt, a meshed state is deteriorated to pose a problem in durability. Therefore, when the belt is used in the speed reducing machine of the electric power steering apparatus, the tension of the belt needs to maintain at a value in the proper range.

The timing belt is widely adopted for driving a cam shaft of an engine or the like. The engine is rotated only in a constant direction and therefore, a side of exerting the tension and a side of loosening the tension on the belt are determined. Therefore, an automatic tensioner is provided on the side of loosening the tension, the tensioner is pressed to the belt by a pressing force of a predetermined elastic member or the like to constitute a proper value of the tension. An influence of error or variation of the distance between the axis centers and an elongation of the belt is substantially absorbed by elastically deforming the elastic member since the tensioner is displaced. Therefore, the belt tension adjusting mechanism using the elastic member achieves an advantage of capable of flexibly dealing with almost all of error and deformation of a constituting member.

However, a situation differs in a power transmitting system in which a rotational direction is changed both in regular and reverse direction. For example, when a timing belt is used in a speed reducing machine of an electric power steering apparatus, different from an engine, a rotational direction of the speed reducing machine is not constant. That is, the steering wheel is turned both to the right and to the left and therefore, also the rotational direction of the timing belt is changed in accordance therewith. A string-like member such as a belt can be loaded with only a tension force and therefore, one side of the belt is loaded with a tension for driving and other side thereof is not loaded therewith. When the rotational direction is changed, in belt driving, a side exerted with the tension and a side of loosening the tension are alternately changed in accordance with the change.

For example, in JP-A-2003-220958 (hereafter, described as "Patent Reference 4"), it is known to adjust a tension by using a tensioner. When an initial tension is exerted to a belt by using the tensioner by elastic force, a side provided with the tensioner is changed from a side of loosening the tension to a side exerted with the tension in accordance with a change in a rotational direction. Further, the tensioner is moved to a position balanced with the force in accordance with a change in the tension. During the time period, power cannot be transmitted, (or reduced) and therefore, a delay in transmitting power is brought about. The delay in transmitting power stays the same even when the tensioners are provided on both sides.

In a power steering apparatus, when such a delay in transmitting power is brought about, an assisting force is not transmitted during the time period even when an assisting motor is rotated. Since the steering wheel is not assisted, when the steering wheel is turned back, the steering wheel becomes heavy. At this occasion, a driver feels as if the steering wheel were caught by something and therefore, a steering feeling is deteriorated.

When a timing belt is used in a speed reducing machine of an electric power steering apparatus in order to avoid such a phenomenon, as described in JP-A-2003-220959 (hereafter, described as "Patent Reference 5"), it is necessary to exert an initial tension by utilizing an elastic force of the belt per se by adjusting a distance between axis centers of pulleys, or providing an idle pulley to adjust a center position of the idle pulley, that is, without using a tensioner by an elastic force.

At an initial stage when an automobile starts running, temperatures of respective parts and respective apparatus are low, however, when running is continued, the temperatures rise. The temperature rise is not exceptional also in a power steering apparatus. By the temperature rise, a total of the power steering apparatus is expanded and therefore, a change is produced in the distance between the axis centers of two pulleys on which the belt is made to wrap, or the position of the idle pulley. Although the belt per se is also expanded, generally, an amount thereof is small. As a general result of thermal expansion thereof, a change is produced in a tension of the belt. Particularly when the tensioner by an elastic force is not used, a difference in displacement of thermal expansion cannot be absorbed by displacement of the elastic member and therefore, almost all of the difference in displacement by thermal expansion significantly changes an average tension of the belt. This poses the above-described problem.

A general belt comprises rubber and a core wire and glass fiber is used as a material of the core wire. Further, aluminum is generally used in a housing of the electric power steering apparatus. Linear expansion coefficients of both members are respectively as follows.

Glass fiber: 0.5 through $0.7 \times 10^{-5}$/° C.

Aluminum: $2.4 \times 10^{-5}$/° C.

When a temperature range of using the electric power steering apparatus is set to −40° C. through 120° C., the above-described difference in the linear expansion coefficients cannot be disregarded. When the elastic member is not used, the tension of the belt is significantly varied in accordance with the change in the temperature owing to the difference to effect an adverse influence on a function of the electric power steering apparatus.

SUMMARY OF THE INVENTION

It is an object thereof to provide a belt speed reducing apparatus for an electric power steering and an electric power steering apparatus capable of reducing operating sound without making layout difficult and giving an excellent steering feeling.

The object of the invention is achieved by the following constitution.

(1) A belt speed reducing apparatus for an electric power steering apparatus comprising a drive pulley having a first helical gear and supported to be able to drive to rotate, a driven pulley having a second helical gear and rotatably supported, a drive belt hung over the drive pulley and the driven pulley and having a third helical gear brought in mesh with the first and the second helical gears, wherein a relationship of tan $\beta < \mu$ is established between a twist angle $\beta$ of the respective helical gears and a friction coefficient $\mu$ between the first or the second helical gear and the third helical gear.

(2) An electric power steering apparatus comprising a housing, a rack shaft supported by the housing movably in an axial direction and to be hampered from being rotated, a rack portion provided at the rack shaft, a male screw portion provided at the rack shaft, a nut constituting a ball screw mechanism by being screwed to the male screw portion via a ball and supported by the housing rotatably and unmovably in the axial direction, a drive pulley having a first helical gear and rotatably supported, a driven pulley coupled to the nut with regard to rotation thereof, having a second helical gear and rotatably supported, a drive belt hung over between the drive pulley and the driven pulley and having a third helical gear to be able to be brought in mesh with the first and the second helical gears, an assisting motor for driving the drive pulley, a pinion brought in mesh with rack teeth of the rack portion, an input shaft inputted with a steering force from a steering wheel, a torque detecting apparatus for detecting a torque applied to the pinion by the input shaft, wherein a relationship of tan $\beta < \mu$ is established between a twist angle $\beta$ of the respective helical gears and a friction coefficient $\mu$ between the first or the second helical gear and the third helical gear.

(3) An electric power steering apparatus comprising an assisting motor for supplying a steering assisting force, a rack shaft for turning a running wheel, a first rotating member arranged coaxially with a rotating shaft of the assisting motor, a second rotating member driven to rotate by the first rotating member for transmitting rotation of the first rotating member to a drive converting apparatus for converting rotation of the first rotating member to movement in an axial direction of the rack shaft, wherein the assisting motor includes a motor flange rotatably mounted to a housing of the electric power steering apparatus, and an axis center of the motor flange is in parallel with an axis center of the first rotating member and is remote from the axis center of the first rotating member by a predetermined dimension.

(4) The electric power steering apparatus described in (3), characterized in that the first rotating member is an input gear arranged coaxially with a rotating shaft of the assisting motor and the second rotating member is an output gear for receiving a rotational power of the input gear.

(5) The electric power steering apparatus described in (4), characterized in that the input gear is constituted integrally with the rotating shaft of the assisting motor.

(6) The electric power steering apparatus described in (4), characterized in that the drive converting apparatus is a ball screw apparatus and the output gear transmits the rotational power of the input gear to a nut of the ball screw apparatus.

(7) The electric power steering apparatus described in (3), characterized in that the drive converting apparatus comprises a pinion coupled with a worm wheel shaft of a worm gear speed reducing apparatus and a rack shaft brought in mesh with the pinion, the first rotating member is a worm coupled with the rotating shaft of the assisting motor, and the second rotating member is a worm wheel brought in mesh with the worm.

(8) The electric power steering apparatus described in (7), characterized in that the worm is constituted integrally with the rotating shaft of the assisting motor.

(9) The electric power steering apparatus described in (3), characterized in that the drive converting apparatus is a ball screw apparatus, the first rotating member is a drive pulley arranged coaxially with the rotating shaft of the assisting motor, and the second rotating member is a driven pulley driven by the drive pulley via a drive belt.

(10) The electric power steering apparatus described in (9), characterized in that the drive pulley is constituted integrally with the rotating shaft of the assisting motor.

(11) The electric power steering apparatus described in (4), characterized in that a gear apparatus comprising the input gear constituting the first rotating member and the output gear constituting the second rotating member is a gear apparatus including any one of a spur gear, a helical gear, a worm and a worm wheel.

(12) A belt speed reducing apparatus for an electric power steering comprising a housing, a drive belt, a drive pulley rotatably supported by the housing, exerted with a rotation drive force and hung with a drive belt, a driven pulley rotatably supported by the housing and rotated by being transmitted with a power from the drive pulley by being hung with the drive belt, and a tension adjusting mechanism for adjusting a tension of the drive belt, wherein the tension adjusting mechanism includes a canceling expansion portion comprising a material for producing a variation in the tension opposed to a variation in the tension produced at the drive belt when a temperature of the belt speed reducing apparatus is varied.

(13) The belt speed reducing apparatus for an electric power steering apparatus described in (12), characterized in that the drive belt is a timing belt.

(14) The belt speed reducing apparatus for an electric power steering apparatus described in (12), characterized in that the canceling expansion portion of the tension adjusting mechanism comprises a material having a linear expansion coefficient smaller than a linear expansion coefficient of a material of the housing.

(15) The belt speed reducing apparatus for an electric power steering apparatus described in (12), characterized in that materials of the housing, a core wire of the drive belt and the canceling expansion portion of the tension adjusting mechanism are respectively aluminum, glass fiber and ceramics.

(16) The belt speed reducing apparatus for an electric power steering apparatus described in (12), characterized in that the tension adjusting mechanism comprises a roller holder supported pivotably by the housing, a tension roller supported rotatably by the roller holder and a pivot adjusting member capable of adjusting an angle of pivoting the roller holder by engaging a front end therewith to be able to adjust a position of pressing the belt by the tension roller and including the canceling expansion portion on a side of the front end.

(17) The belt speed reducing apparatus for an electric power steering apparatus described in (12), characterized in that the tension adjusting mechanism comprises a shaft supporting frame fixed to the housing and constituting the canceling expansion portion, a roller holder supported pivotably by the shaft supporting frame, a tension roller supported rotatably by the roller holder, and a pivot adjusting member capable of adjusting an angle of pivoting the roller holder by engaging a front end therewith to be able to adjust a position of pressing the belt by the tension roller.

(18) The belt speed reducing apparatus for an electric power steering apparatus described in (17), characterized in that the shaft supporting frame constitutes a C-shape and the roller holder is supported axially by two pieces of legs thereof.

(19) The belt speed reducing apparatus for an electric power steering apparatus described in (12), characterized in that the tension adjusting mechanism comprises a pulley holder rotatably supporting the drive pulley and supported pivotably by the housing, and a pivot adjusting member capable of adjusting an angle of pivoting the pulley holder by engaging a front end thereof to be able to adjust a distance between axis centers of the drive pulley and the driven pulley and including the canceling expansion portion on a side of the front end.

(20) The belt speed reducing apparatus for an electric power steering apparatus described in (19), characterized in that the pivot adjusting member includes a pivot adjusting male screw portion for screwing with a pivot adjusting female screw provided at the housing at a root portion thereof.

(21) An electric power steering apparatus characterized in comprising the belt speed reducing apparatus described in (12), a rack shaft supported by the housing rotatably and movably in an axial direction and including a male screw portion constituting a ball screw mechanism along with a rack portion having rack teeth with which a pinion rotated by a steering wheel is brought in mesh, a nut screwed with the male screw portion of the ball screw mechanism via a ball for transmitting rotation of the driven pulley, and an assisting motor supported by the housing for driving to rotate the drive pulley.

(22) An electric power steering apparatus comprising a housing, a drive belt, a drive pulley supported rotatably by the housing, exerted with a rotation drive force, and hung with the drive belt, a driven pulley supported rotatably by the housing and rotated by being transmitted with a power from the drive pulley by being hung with the drive belt, and an assisting motor for driving to rotate the drive pulley, wherein the assisting motor includes a motor flange mounted to the housing by a plurality of bolts, and the motor flange is made to be pivotable relative to the housing by constituting a fulcrum by a single piece of the bolts.

(23) The electric power steering apparatus described in (22), characterized in that the fulcrum is arranged at a position at which an angle made by a line connecting axis centers of the drive pulley and the driven pulley and a line connecting the axis center of the drive pulley and the fulcrum is made to be equal to or smaller than 90 degrees.

(24) The electric power steering apparatus described in (22), characterized in that an angle of a harness take out port of the assisting motor made by a line connecting axis centers of the drive pulley and the driven pulley and a line connecting the axis center of the drive pulley and the harness take out port is equal to or smaller than 90 degrees.

(25) The electric power steering apparatus described in (22), characterized in further comprising an idler pulley for exerting a predetermined tension to the drive belt.

(26) The electric power steering apparatus described in (25), characterized in that the idler pulley is arranged at a position at which an angle of making the belt wrap on the drive pulley is increased.

According to the belt speed reducing apparatus for an electric power steering of (1), the twist angle $\beta$ and the friction coefficient $\mu$ are selected to establish the relationship of tan $\beta<\mu$ between the twist angle $\beta$ of the respective helical gears and the friction coefficient $\mu$ between the first or the second helical gear and the third helical gear. By selecting $\beta$ and $\mu$ in this way, a friction force becomes larger than a force generated in a teeth streak direction of the drive belt and the force of moving the drive belt in the teeth streak direction is canceled by the friction force. Therefore, a disadvantage inherently provided to the drive belt having the helical gear, that is, a force in the direction of the belt width (thrust force) is restrained. Therefore, a force (face pressure) operated between an end face of the drive belt and a face of a flange provided to either of the drive pulley and the driven pulley is weakened. Thereby, emittance of rustling sound can be reduced. Further, since the face pressure is small, wear can be reduced from being brought about and therefore, the durability of the drive belt can be promoted.

Further, according to the electric power steering apparatus of (2), by establishing the relationship of tan $\beta<\mu$ between the twist angle $\beta$ of the respective helical gears and the friction coefficient $\mu$ between the first or the second helical gear and the third helical gear, the thrust force inherently provided to the helical gear is reduced a. Therefore, a large face pressure is not operated to the face of the flange provided to either of the drive pulley and the driven pulley and the end face of the drive belt, thereby, the rustling sound and wear produced at the belt speed reducing apparatus of a helical gear type can be reduced. Further, the durability can be promoted thereby.

Further, according to the electric power steering apparatus of (3), the assisting motor is provided with the motor flange rotatably mounted to the housing of the electric power steering apparatus, the axis center of the motor flange is in parallel with the axis center of the first rotating member and is remote from the axis center of the first rotating member by the predetermined dimension. Therefore, by rotating the motor flange, the backlash can be adjusted to the proper value by changing the position of the first rotating member.

Further, according to the electric power steering apparatus of (4), the first rotating member is the input gear arranged coaxially with the rotating shaft of the assisting motor, the second rotating member is the output gear receiving the rotating power of the input gear. Therefore, by rotating the motor flange, the axis center of the input gear is rotated around the motor flange to vary an interval of the input gear and the backlash can be adjusted to the proper value. By the constitution, productivity can be promoted by dispensing with complicated operation of matching or the like for searching a combination providing an optimum backlash by selecting gears brought in mesh with each other.

Further, according to the electric power steering apparatus of (5), the input gear is constituted integrally with the rotating shaft of the assisting motor and therefore, a number of parts of a bearing and the like is reduced and fabrication cost can be reduced.

Further, according to the electric power steering apparatus of (6), the drive converting apparatus is the ball screw apparatus, the output gear transmits the rotational power of the input gear to the nut of the ball screw apparatus and therefore, the rack shaft can firmly be moved.

Further, according to the electric power steering apparatus of (7), the drive converting apparatus is constituted by the pinion coupled to the worm wheel shaft of the worm gear speed reducing apparatus and the rack shaft brought in mesh with the pinion, the first rotating member is the worm coupled to the rotating shaft of the assisting motor, the second rotating member is the worm wheel brought in mesh with the worm. Therefore, by rotating the motor flange, the backlash can be adjusted to the proper value by changing the interval between the axis center of the worm and the axis center of the worm wheel. By the constitution, productivity can be promoted by dispensing with the complicated operation of matching or the like searching for a combination providing the optimum backlash by selecting gears brought in mesh with each other.

Further, according to the electric power steering apparatus of (8), the worm is constituted integrally with the rotating shaft of the assisting motor and therefore, a number of parts of a bearing and the like is reduced and fabrication cost can be reduced.

Further, according to the electric power steering apparatus of (9), the drive converting apparatus is the ball screw apparatus, the first rotating member is the drive pulley arranged coaxially with the rotating shaft of the assisting motor, the second rotating member is the driven pulley driven by the drive pulley via the drive belt. Therefore, the drive pulley is directly rotated by rotating the rotating shaft of the assisting motor and therefore, efficient power transmission can be carried out by eliminating transmission loss from the rotating shaft. Therefore, even in the drive belt having a large dispersion of products, adjustment of the tension is facilitated to adjust and productivity can be promoted.

Further, according to the electric power steering apparatus of (10), the drive pulley is constituted integrally with the rotating shaft of the assisting motor and therefore, a number of parts of a bearing and the like is reduced and fabrication cost can be reduced.

Further, according to the electric power steering apparatus of (11), the gear apparatus constituted by the input gear constituting the first rotating member and the output gear constituting the second rotating member is constituted by any gear apparatus including the spur gear, the helical gear, the worm and the worm wheel. Therefore, firm power transmission can be carried out by a comparatively inexpensive apparatus without using a complicated gear apparatus.

Further, according to the belt speed reducing apparatus for an electric power steering of (12), the tension adjusting mechanism for adjusting the tension of the drive belt is provided, the tension adjusting mechanism includes the canceling expansion portion comprising the material producing the variation of the tension opposed to the variation of the tension produced at the drive belt when the temperature of the belt speed reducing apparatus is varied. Therefore, an elastic member such as a spring is not used and therefore, rotation from the assisting motor can be transmitted to the driven pulley without delay. Therefore, even when the direction of turning the steering wheel is changed, a driver does not feel a deterioration in a feeling, that is, a feeling as if the steering wheel were caught by something owing to a delay in transmission. Further, an increase in the tension of the drive belt accompanied by temperature rise of the housing caused by not using the elastic member is canceled by the tension adjusting mechanism and therefore, power transmission is not hampered thereby.

Further, according to the belt speed reducing apparatus for an electric power steering of (13), the drive belt is the timing belt and therefore, since the timing belt is a belt which is not elongated and rich in durability and therefore, the timing belt can withstand sufficiently the use of a long period of time.

Further, according to the belt speed reducing apparatus for an electric power steering apparatus of (14), the canceling expansion portion of the tension adjusting mechanism comprises the material having the linear expansion coefficient smaller than that of the material of the housing. Therefore, even when the temperature of the housing is elevated, the canceling expansion portion is not thermally expanded as much as the housing and therefore, a change in the tension by the temperature can be canceled.

Further, according to the belt speed reducing apparatus for an electric power steering of (15), the materials of the housing, the core wire of the drive belt and the canceling expansion portion of the tension adjusting mechanism are respectively aluminum, glass fiber and ceramics. Therefore, owing to the materials, even when the temperature of the housing is elevated, the materials are not thermally expanded as much as the material of the housing and therefore, the change in the tension by the temperature can be canceled.

Further, according to the belt speed reducing apparatus for an electric power steering apparatus of (16), the tension adjusting mechanism is provided with the roller holder supported pivotably by the housing, the tension roller supported rotatably by the roller holder, and the pivot adjusting member capable of adjusting the angle of pivoting the roller holder by engaging the front end therewith and having the canceling expansion portion on the front end side in order to be able to adjust the position of pressing the belt by the tension roller. Therefore, by adjusting an amount of screwing the pivot adjusting member, an initial tension thereof can be adjusted.

Further, according to the belt speed reducing apparatus for an electric power steering apparatus of (17), the tension adjusting mechanism is provided with the shaft supporting frame fixed to the housing and constituting the canceling expansion portion, the roller holder supported pivotably by the shaft supporting frame, the tension roller supported rotatably by the roller holder, and the pivot adjusting member capable of adjusting the angle of pivoting the roller holder by engaging the front end therewith in order to be able to adjust the position of pressing the belt by the tension roller. Therefore, by adjusting the amount of screwing the pivot adjusting member, an initial tension thereof can be adjusted.

Further, according to the belt speed reducing apparatus for an electric power steering apparatus of (18), the shaft supporting frame is constituted by the C-shape, the roller holder is axially supported by two pieces of the legs and therefore, the roller holder can stably be supported.

Further, according to the belt speed reducing apparatus for an electric power steering apparatus of (19), the tension adjusting mechanism is provided with the pulley holder rotatably supporting the drive pulley and supported pivotably by the housing, and the pivot adjusting member capable of adjusting the angle of pivoting the pulley holder by engaging the front end therewith and having the canceling expansion portion on the front end side in order to able to adjust the distance between the axis centers of the drive pulley and the driven pulley. Therefore, the attitude of the pulley holder is restrained by the pivoting adjusting member, a position of the drive pulley differs by the attitude of the pulley holder and therefore, by adjusting the amount of screwing the pivot adjusting member, the tension of the drive belt can be adjusted.

Further, according to the belt speed reducing apparatus for an electric power steering apparatus of (20), the pivot adjusting member includes the pivot adjusting male screw portion or screwing with the pivot adjusting female screw portion provided at the housing at the root portion and therefore, by extracting and retracting the screw, the pivot adjusting member can accurately be moved.

Further, according to the electric power steering apparatus of (21), the electric power steering apparatus is provided with the rack shaft including the male screw portion constituting the ball screw mechanism along with the rack teeth portion supported by the housing unrotatably and movably in the axial direction and brought in mesh with the pinion rotated by the steering wheel, the nut screwed with the male screw portion of the ball screw mechanism via the ball and transmitted with rotation of the driven pulley, and the assisting motor supported by the housing for driving to rotate the drive pulley. Therefore, by the electric power steering apparatus using the belt speed reducing apparatus which does not use an elastic member for maintaining the tension of the drive belt constant, rotation from the assisting motor can be transmitted to the driven pulley without delay. Therefore, even when the direction of turning the steering wheel is changed, the driver does not feel a deterioration in the feeling previously explained, that is, the feeling as if the steering wheel were caught by something owing to the delay in transmission.

Further, according to the electric power steering apparatus of (22), the assisting motor is provided with the motor flange mounted to the housing by the plurality of bolts, the motor flange can be pivoted by constituting the fulcrum by a single piece of the bolts relative to the housing. Therefore, by pivoting the motor flange by constituting the fulcrum by the bolt, the distance between the axis centers of the drive pulley and the driven pulley can be changed and therefore, adjustment of the tension of the drive belt can simply be carried out. Further, by using the bolt as the fulcrum, the tension adjusting mechanism can be constituted inexpensively without increasing a number of parts.

Further, according to the electric power steering apparatus of (23), the fulcrum is arranged at the position at which the angle made by the line connecting the axis centers of the drive pulley and the driven pulley and the line connecting the axis center of the drive pulley and the fulcrum is made to be equal to or smaller than 90 degrees. Therefore, the distance between the axis centers of the drive pulley and the driven pulley can considerably be changed with respect to a small pivoting angle by the assisting motor and a movable region of the assisting motor can be set to be small.

Further, according to the electric power steering apparatus of (24), the angle of the harness take out port of the assisting motor made by the line connecting the axis centers of the drive pulley and the driven pulley and the line connecting the axis center of the drive pulley and the harness take out port is equal to or smaller than 90 degrees. Therefore, layout performance can be promoted by preventing the harness take out port 308 in the projected shape from being arranged at the position at which there is a concern of interference with a vehicle body, particularly, accessories at inside of an engine room.

Further, according to the electric power steering apparatus of (25), the idler pulley for providing the predetermined tension to the drive belt is provided. Therefore, adjustment of the tension can be carried out even when a direction of moving the drive pulley by pivoting the assisting motor is the direction which is not efficient in adjusting the interval between the axis centers.

Further, according to the electric power steering apparatus of (26), the idler pulley is arranged such that the angle of the drive pulley of being made to wrap on the belt is increased and therefore, the durability of the drive belt can be promoted.

DETAILED DESCRIPTION OF THE INVENTION

Figure 1:
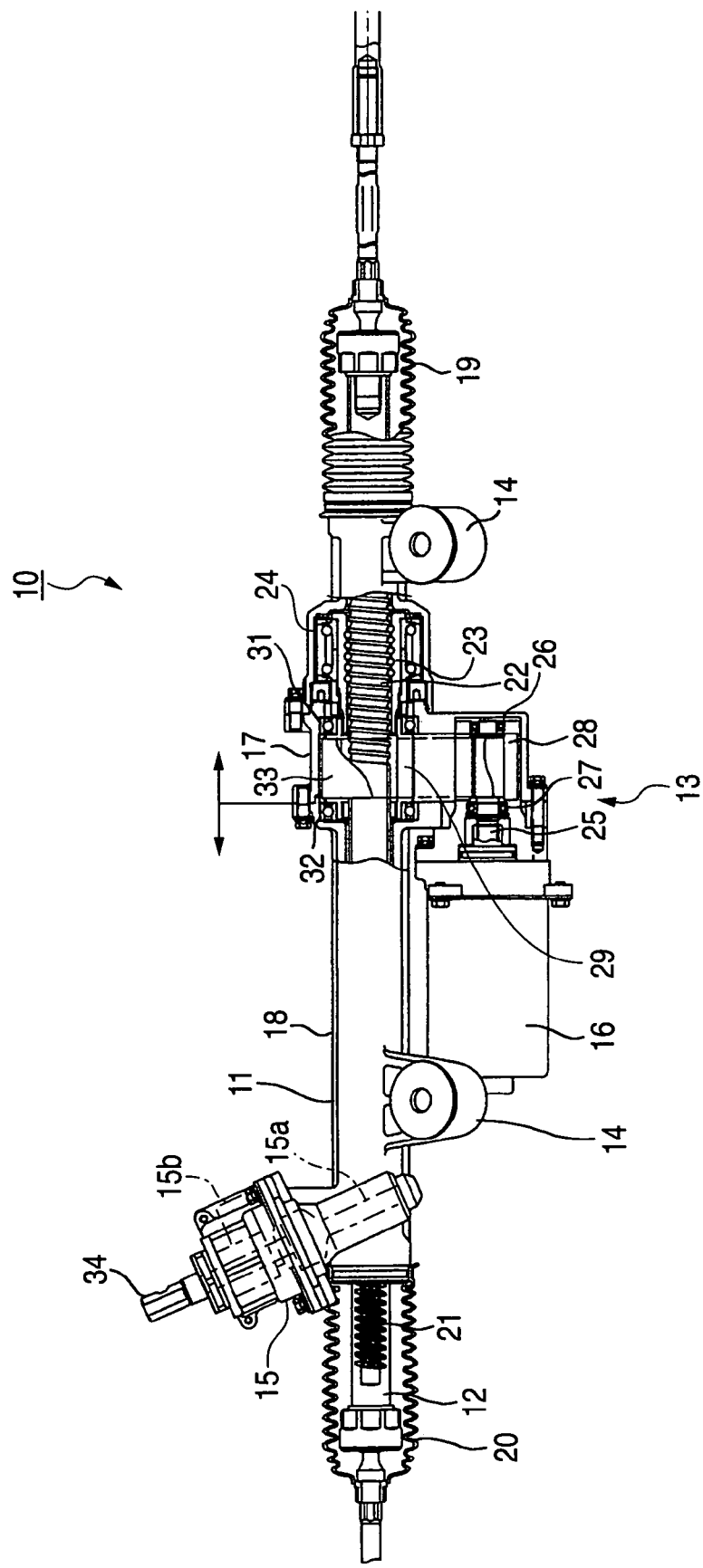
FIG. 1 is a partially broken front view showing a first embodiment of the invention.
Figure 2:
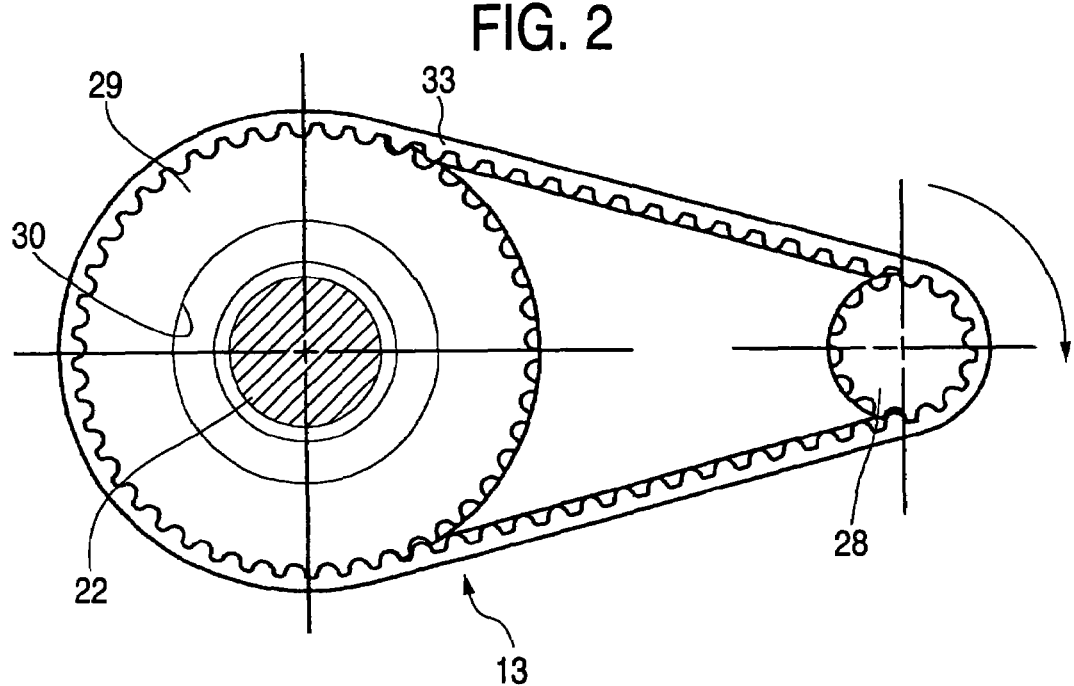
FIG. 2 is a sectional view of an essential portion of a belt speed reducing apparatus.

An explanation will be given of belt speed reducing apparatus for electric power steering apparatus and electric power steering apparatus according to respective embodiments of the invention in details in reference to the drawings as follows.

First Embodiment

First, an explanation will be given of a belt speed reducing apparatus for an electric power steering apparatus and the electric power steering apparatus according to a first embodiment of the invention in details in reference to FIG. 1 through FIG. 4.

The electric power steering apparatus 10 according to the first embodiment is provided with the housing 11, the rack shaft 12, the belt speed reducing apparatus 13, a vehicle body attaching portion 14, a pinion portion 15 and the assisting motor 16.

The housing 11 is provided with a two divisions structure divided in two substantially at a center thereof and comprising a right housing 17 and a left housing 18. The rack shaft 12 is supported by the housing 11 movably in an axial direction but being hampered from being rotated at inside of the housing 11. Both ends of the rack shaft 12 are projected from both ends of the housing 11. The both ends are connected with a vehicle body side steering mechanism for changing a direction of a wheel such as a tie rod or the like. Projected portion thereof are respectively covered by cover bellows 19, 20 to prevent dust and dirt from invading from the both ends to inside of the housing 11.

A center side of the rack shaft 12 is provided with the rack portion 21 and the male screw portion 22 to align in the axial direction and the male screw portion 22 is screwed with the nut 23. The nut 23 is supported by a rolling bearing 24 at inside of the right housing 17 rotatably but being constrained with regard to movement in the axial direction. A ball is interposed between the male screw portion 22 and a female screw portion of the nut 23 to thereby constitute a ball screw mechanism.

The assisting motor 16 is provided at the left housing 18 to make a motor shaft 25 in parallel with the male screw portion 22. The motor shaft 25 is coupled with the drive pulley 28 supported respectively by the right housing 17 and the left housing 18 by rolling bearings 26, 27.

The driven pulley 29 includes a through hole 30 (shown in FIG. 2) for penetrating the rack shaft 12 and is supported by the housing 11 rotatably by rolling bearings 31, 32 on both sides thereof. The driven pulley 29 and the nut 23 are coupled with each other by spline coupling to thereby transmit rotation of the driven pulley 29 to the nut 23. The drive pulley 28 and the driven pulley 29 are respectively formed with a first and a second helical gear, the drive belt 33 having a third helical gear for being brought in mesh with the first and the second helical gears is hung over between the two pulleys to constitute the belt speed reducing apparatus 13. A description will be given later of a twist angle of each of the helical gears.

The pinion portion 15 is provided with the input shaft 34 for inputting a steering force from a handle (steering wheel), the pinion 15a and the torque detecting apparatus 15b, and the input shaft 34 and the pinion 15a are coupled with each other via a torsion bar of the torque detecting apparatus 15b. The pinion 15a is brought in mesh with rack teeth of the rack portion 21 of the rack shaft 12.

Figure 3:
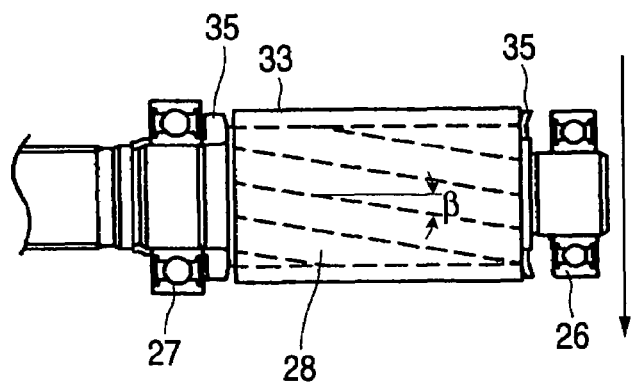
FIG. 3 is a view enlarging a surrounding of a drive pulley.
Figure 4:
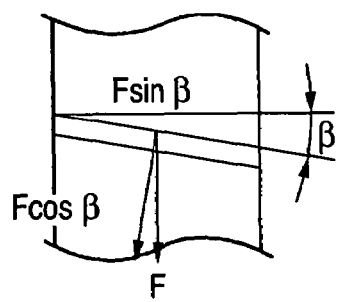
FIG. 4 is an explanative view showing a relationship of forces exerted to a tooth face.

FIG. 3 and FIG. 4 are respectively a view enlarging a vicinity of the drive pulley 28 and an explanative view showing a relationship of forces exerted to a tooth face. The pair of the flanges 35, 35 are provided at both end faces of the drive pulley 28. The flanges 35, 35 are flanges for preventing the drive belt 33 from being drawn out. Further, the pair of flanges may not be provided at the both end faces of the drive pulley 28 as in the embodiment, or may be constituted to provide at both end faces of the driven pulley 29. The drive belt 33 is provided with the third helical gears (belt gears) having a twist angle of β at equal intervals on an inner side periphery thereof. The drive pulley 28 and the driven pulley 29 are provided with the first and the second helical gears brought in mesh with the belt gears similarly by a twist angle of β.

The twist angle β and a friction coefficient μ are selected such that a relationship of tan β<μ is established between the twist angle β and the friction coefficient μ between the drive belt 33 and each pulley, that is, the friction coefficient μ between the first or the second helical gear and the third helical gear. By selecting β and μ in this way, a friction force μFcos β becomes larger than a force Fsin β generated in a tooth streak direction of the drive belt 33, and a force of moving the drive belt 33 in the teeth streak direction is canceled by the friction force. Therefore, a disadvantage inherently provided to the drive belt 33 having the helical teeth, that is, a force in the belt width direction (thrust force) is restrained and therefore, a force (face pressure) operated between end faces of the drive belt 33 and faces of the flanges 35, 35 is weakened. Thereby, emittance of rustling sound can be reduced. Further since the face pressure is small, wear can be reduced from being brought about and therefore, durability of the belt can be promoted.

Operation as a whole of the electric power steering apparatus 10 is as follows. When the steering wheel is operated, the rotation is transmitted to the input shaft 34 to rotate the pinion 15a while twisting the torsion bar via the torsion bar. Rotation of the pinion 15a is transmitted to the rack shaft 12 and the rack shaft 12 is moved in a left and right axial direction of FIG. 1.

Meanwhile, an amount of twisting the torsion bar is detected by the torque detecting apparatus 15b. An output signal of the torque detecting apparatus 15b is inputted to a control apparatus, not illustrated, to rotate the assisting motor 16. A rotational force of the assisting motor 16 is transmitted to the drive pulley 28, the drive belt 33 and the driven pulley 29 to rotate the nut 23. The rack 12 is moved in the axial direction by rotating the nut 23. A moving direction at this occasion coincides with a direction of moving the pinion 15a and therefore, the pinion 15a assists a force of moving the rack shaft 12. That is, a rotational force of the steering wheel is assisted by the assisting motor 16 and therefore, a driver feels as if the steering wheel could be operated by a light force.

According to the belt speed reducing apparatus 13 of the electric power steering apparatus 10 explained above, the thrust force inherently provided to the helical teeth is reduced.

Therefore, a large face pressure is not operated to the faces of the flanges 35, 35 of the drive pulley 28 and the end face of the drive belt 33, thereby, rustling sound and wear generated at the belt speed reducing apparatus of the spiral gear type can be reduced. Further, thereby, the durability of the drive belt 33 can be promoted.

Second Embodiment

Figure 5:
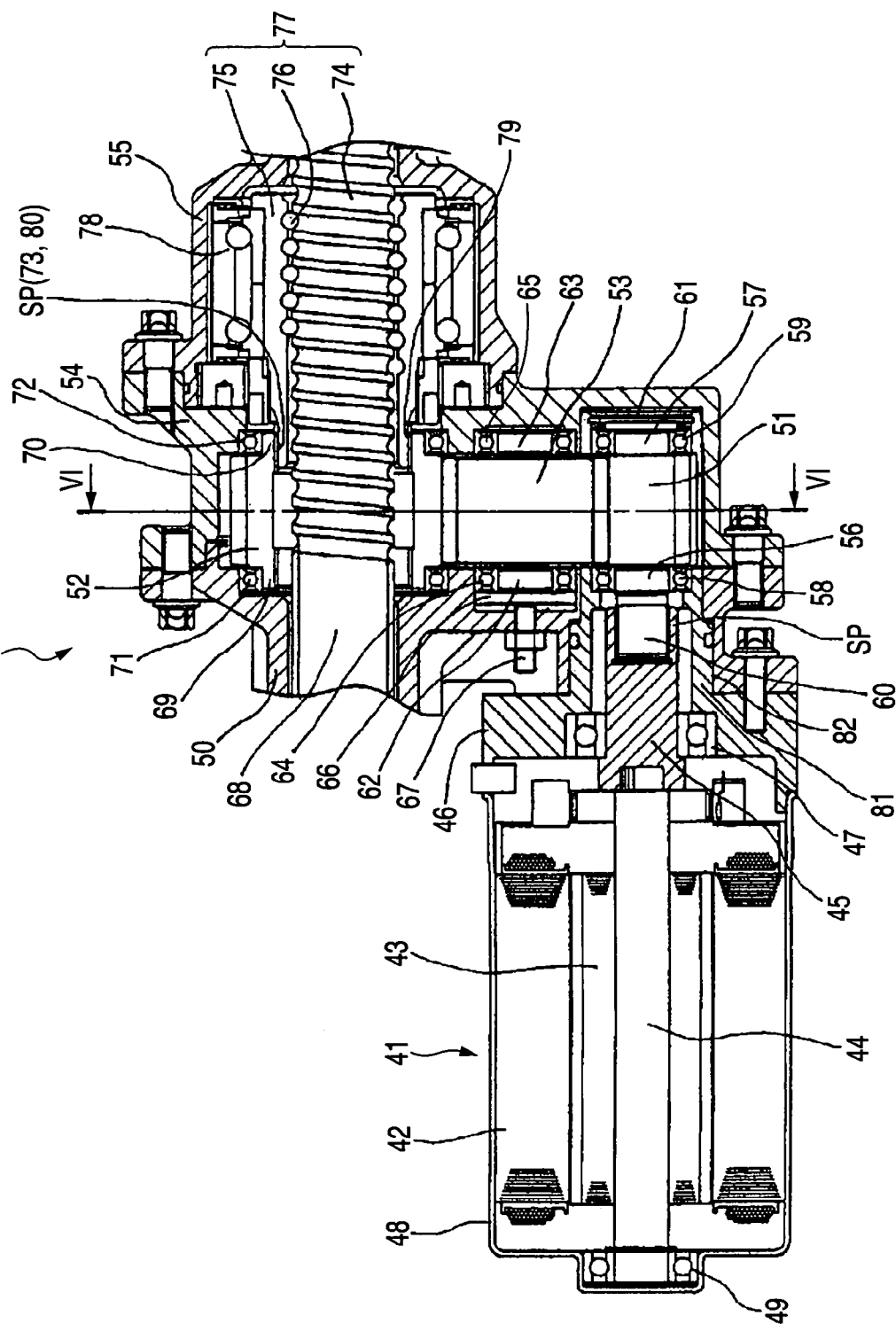
FIG. 5 is a sectional view of an essential portion showing a second embodiment of the invention.
Figure 6:
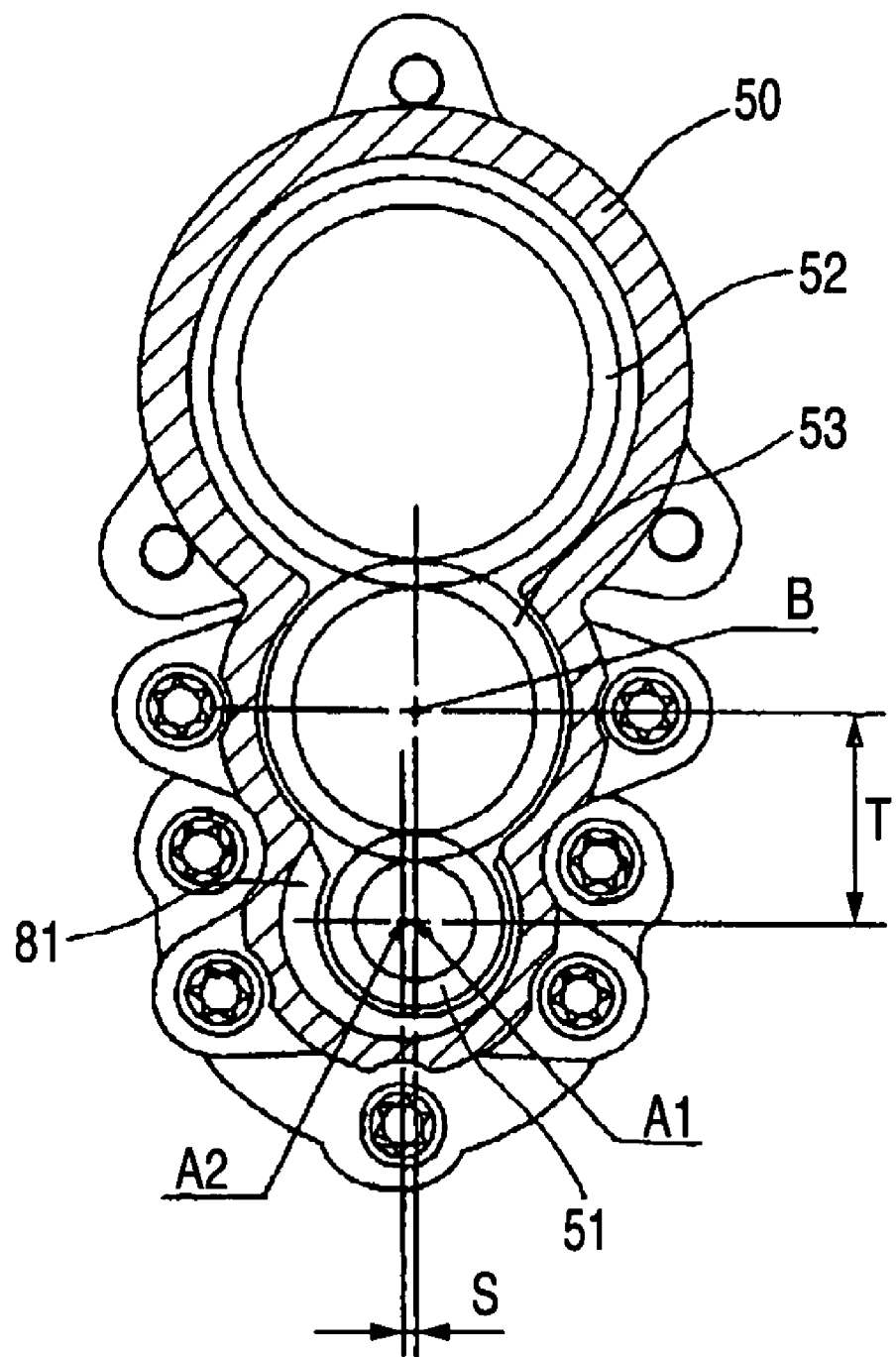
FIG. 6 is a sectional view taken along a line VU-VI of FIG. 5.

Next, an explanation will be given of an electric power steering apparatus according to a second embodiment of the invention in reference to FIG. 5 and FIG. 6. Further, according to the embodiment, a gear reducing mechanism using a helical gear is adopted.

In the electric power steering apparatus 40 according to the second embodiment, the assisting motor 41 is provided with a stator 42 and a rotor 43 and one end of the motor shaft 44 fixed to the rotor 43 is fixed with an extended portion 45. The extended portion 45 of the motor shaft 44 is supported by a bearing 47 held by the motor flange 46, other end of the motor shaft 44 is supported by a bearing 49 held by a motor housing 48 and the motor shaft 44 is rotatably supported thereby.

In order to avoid interference between the motor housing 48 and a rack shaft housing 50, a distance between axis centers of the input gear and the output gear 52 is constituted to be large and the input gear 51 and the output gear 52 are constituted to be brought in mesh with each other via a middle gear 53.

The input gear 51 constituting a first rotating member, the middle gear 53, and the output gear 52 constituting a second rotating member are held at inside of a housing constituted by the rack shaft housing 50, a gear housing 54, and a rack shaft housing 55 on a side of a ball screw.

Shafts 56 and 57 of the input gear 51 are respectively supported by a bearing 58 held by the rack shaft housing 50 and a bearing 59 held by the gear housing 54. Further, an extended portion 60 of the input gear 51 and the extended portion 45 of the motor shaft 44 are subjected to spline coupling SP. Further, a belleville spring 61 is interposed between an outer ring of the bearing 59 supporting the shaft 57 of the input gear 51 and the gear housing 54 to apply prepressure to the input gear 51 in an axial direction toward the side of the motor via the bearing 59 to thereby prevent rattling in the axial direction.

Shafts 62 and 63 of the middle gear 53 are respectively held by a bearing 64 held by the rack shaft housing 50 and a bearing 65 held by the gear housing 54. Further, a holding plate 66 is interposed between an outer ring of the bearing 64 supporting the shaft 62 of the middle gear 53 and the rack shaft housing 50. The holding plate 66 is pressed by a bolt 67 mounted to the rack shaft housing 50 to apply prepressure in an axial direction to the middle gear 53 to prevent rattling in the axial direction.

The output gear 52 is formed in a cylindrical shape and penetrated with the rack shaft 68 at inside thereof. Shafts 69 and 70 formed on outer sides of both end portions in an axial direction of the output gear 52 are respectively held by a bearing 71 held by the rack shaft housing 50 and a bearing 72 held by the gear housing 54. Further, a spline groove 73 is formed at an inner face in a cylindrical face of the output gear 52.

The rack shaft 68 coupled with a steering wheel shaft, not illustrated, via a pinion rack mechanism is formed with the male screw portion (spiral groove) 74, the nut 75 is arranged on an outer side of the male screw portion 74, and a number of balls 76 are inserted to fit between the male screw portion 74 of the rack shaft 68 and a female screw portion of the nut 75 to thereby constitute a ball screw mechanism 77.

The nut 75 of the ball screw mechanism 77 is rotatably supported by a bearing 78 arranged at inside of the rack shaft housing 50. A spline projected streak 80 is formed on an outer side of an extended portion 79 of one end of the nut 75 and the spline projected streak 80 and the spline groove 73 formed at the inner face of the output gear 52 are subjected to spline coupling SP.

In the above-described constitution, a driving rotational force of the assisting motor 41 driven by a control apparatus, not illustrated, based on a steering torque of a steering wheel shaft detected by the torque detecting apparatus 15$b$ (refer to FIG. 1) is transmitted to the nut 75 of the ball screw mechanism 77 via the input gear 151, the middle gear 53 and the output gear 52. Further, steering is carried out by changing a direction of a wheel by moving the rack shaft 68 in the axial direction by rotating the nut 75.

Next, an explanation will be given of adjustment of a backlash. Adjustment of a backlash between the input gear 51 and the middle gear 53 is carried out by adjusting an interval between axis centers of the two gears. That is, a cylindrical member 81 of the motor flange 46 is rotatably fitted to a cylindrical recess portion 82 of the rack shaft housing 50. Further, the motor flange 46 supports the motor shaft 44 by the bearing 47 arranged at inside thereof. An axis center A1 of the motor shaft 44 and the input gear 51 and an axis A2 of the cylindrical member 81 formed at an outer portion of the motor flange 46 are eccentric from each other by a dimension s as shown by FIG. 6.

Therefore, when the cylindrical member 81 of the motor flange 46 is rotated in a state of mounting the cylindrical member 81 to the cylindrical recess portion 82, the axis center A1 of the motor shaft 44 and the input gear 51 is rotated around the axis center A2 of the cylindrical member 81 of the motor flange 46, an interval T of the axis center A1 of the input gear 51 relative to an axis center B of the middle gear 53 is varied, a depth of bringing the input gear 51 and the middle gear 53 in mesh with each other is changed and therefore, adjustment of the backlash can be carried out.

In adjusting the backlash between the middle gear 53 and the output gear 52, adjustment of the backlash is carried out by selecting a combination of the middle gear 53 and the output gear 52 providing an optimum backlash amount by matching finish dimensions, that is, measuring finish dimensions of the middle gear 53 and the output gear 52.

According to electric power steering apparatus 40 explained above, when the middle gear 53 and the output gear 52 providing the optimum backlash by matching are determined, thereafter, adjustment of the backlash between the input gear 51 and the middle gear 53 can be carried out by only rotating the motor flange 46.

Third Embodiment

Figure 7:
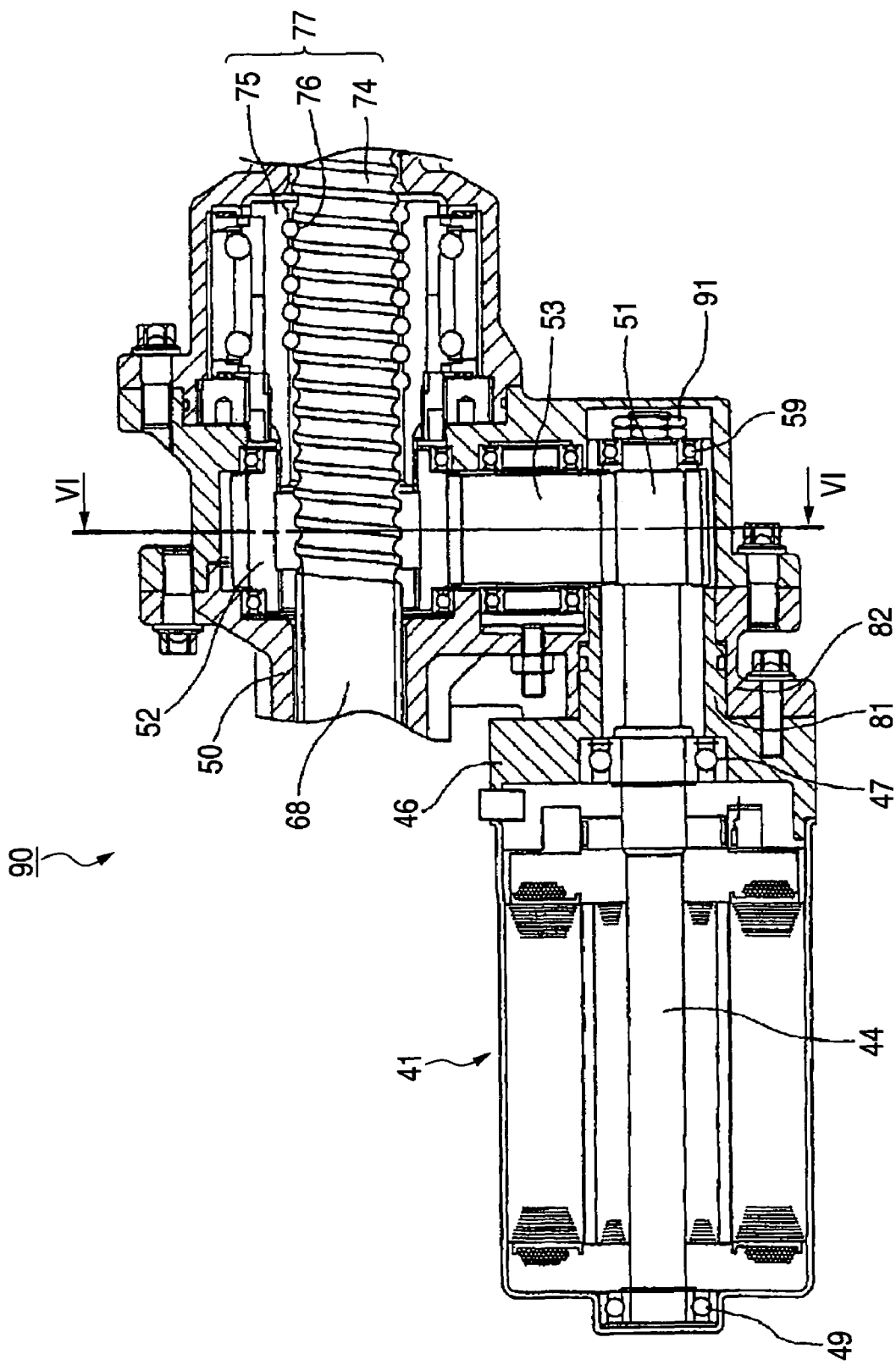
FIG. 7 is a sectional view of an essential portion showing a third embodiment of the invention.

Next, an electric power steering apparatus according to a third embodiment of the invention will be explained in reference to FIG. 7. Further, a gear speed reducing mechanism using a helical gear is adopted also in the embodiment. Further, a sectional view taken along a line VI-VI of FIG. 7 is the same as that shown in FIG. 6 and therefore, illustration thereof will be omitted.

A point of difference of the third embodiment from the second embodiment resides in that the motor shaft 44 and the input gear 51 are integrally constituted and held by three pieces of the bearings 49, 47 and 59 and that an inner ring of the bearing 59 is pressed by a nut 91 mounted to a shaft end portion of the input gear 51 and prepressure is applied to the bearing 47 and the bearing 59 to prevent rattling in an axial direction. The other constitution is the same as that of the second embodiment and therefore, the same members are attached the same notations and a detailed explanation thereof will be omitted.

In the electric power steering apparatus 90 according to the third embodiment, also adjustment of the backlash is the same as that in the second embodiment, when the cylindrical member 81 of the motor flange 46 is rotated in the state of being mounted to the cylindrical recess portion 82 of the rack shaft housing 50, the axis center A1 of the input gear 51 constituting the motor shaft 44 and the first rotating member is rotated around the axis center A2 of the cylindrical member 81 of the motor flange 46, the interval T of the axis center A1 of the input gear 51 relative to the axis center B of the middle gear 53 is changed (refer to FIG. 6), the depth of bringing the input gear 51 and the middle gear 53 in mesh with each other is changed and therefore, adjustment of the backlash can be carried out.

In adjusting the backlash between the middle gear 53 and the output gear 52, adjustment of the backlash is carried out by selecting a combination of the middle gear 53 and the output gear 52 providing an optimum backlash amount by matching finish dimensions, that is, measuring finish dimensions of the middle gear 53 and the output gear 52.

According to the electric power steering apparatus 90 explained above, when the combination of the gears providing the optimum backlash is determined by matching the middle gear 53 and the output gear 52, thereafter, adjustment of backlash between the input gear 51 and the middle gear 53 can be carried out only by rotating the motor flange 46.

Fourth Embodiment

Figure 8:
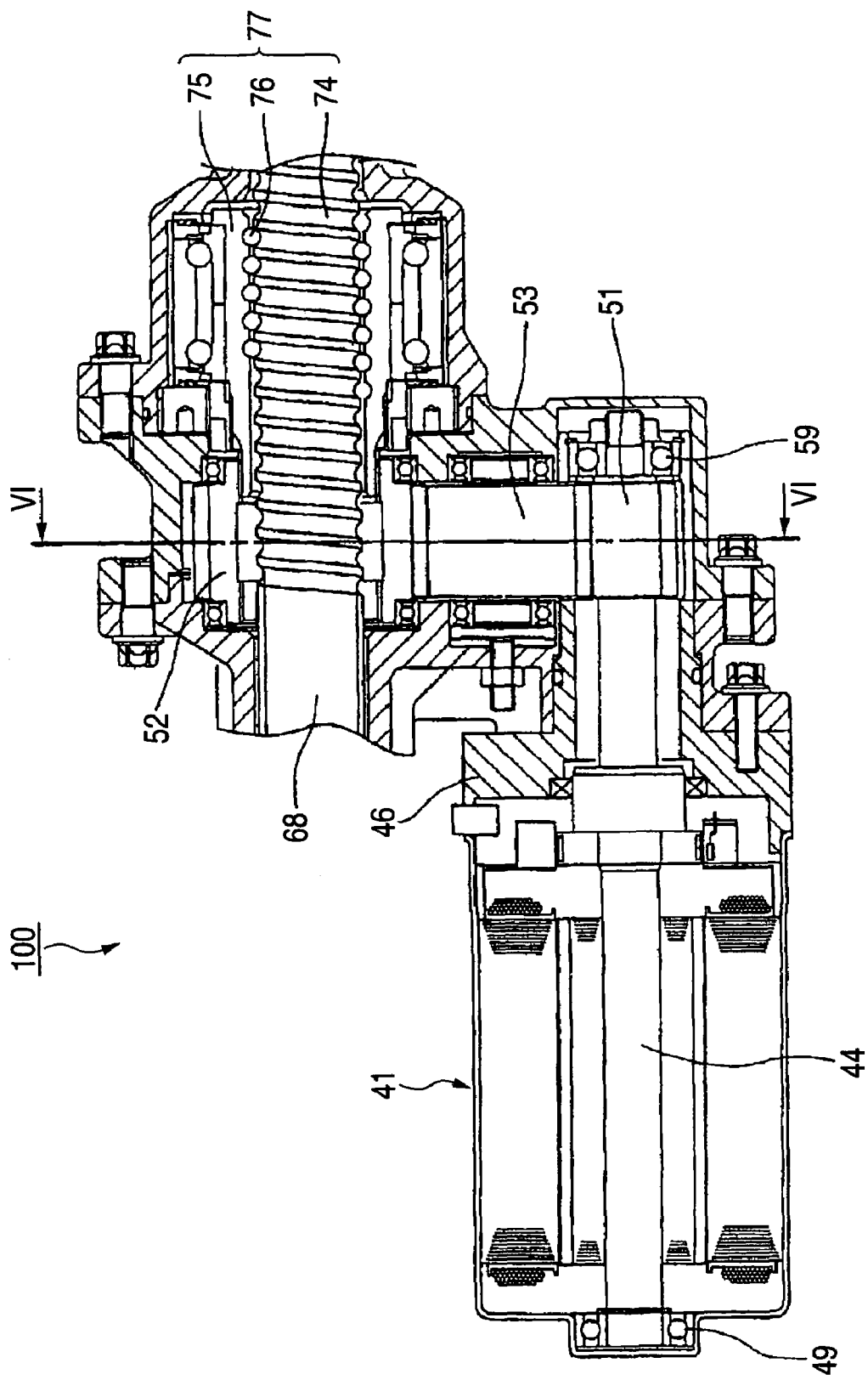
FIG. 8 is a sectional view of an essential portion showing a fourth embodiment of the invention.

Next, an electric power steering apparatus according to a fourth embodiment of the invention will be explained in reference to FIG. 8. Further, a gear speed reducing mechanism using a helical gear is adopted also in the embodiment. Further, a sectional view taken along a line VI-VI of FIG. 8 is the same as that shown in FIG. 6 and therefore, illustration thereof will be omitted.

A point of difference of the fourth embodiment from the second embodiment resides in that the motor shaft 44 and the input gear 51 are integrally constituted and held by two pieces of the bearings 49 and 59 and that the bearing 59 is constituted by a four points contact ball bearing to prevent rattling in the axial direction. The other constitution is the same as that of the second embodiment and therefore, the same members are attached with the same notations and a detailed explanation thereof will be omitted.

In the electric power steering apparatus 100 according to the fourth embodiment, adjustment of the backlash is the same as that of the second embodiment, when the cylindrical member 81 of the motor flange 46 is rotated in the state of being mounted to the cylindrical recess portion 82 of the rack shaft housing 50, the axis center A1 of the motor shaft 44 and the input gear 51 constituting the first rotating member is rotated around the axis center A2 of the cylindrical member 81 of the motor flange 46, the interval T of the axis center A1 of the input gear 51 relative to the axis center B of the middle gear 53 is changed (refer to FIG. 6), the depth of bringing the input gear 51 and the middle gear 53 in mesh with each other is changed and therefore, adjustment of the backlash can be carried out.

In adjusting the backlash between the middle gear 53 and the output gear 52, adjustment of the backlash is carried out by selecting a combination of the middle gear 53 and the output gear 52 providing the optimum backlash amount by matching finish dimensions, that is, measuring finish dimensions of the middle gear 53 and the output gear 52.

According to the electric power steering apparatus 100 explained above, when the combination of the gears providing the optimum backlash is determined by matching the middle gear 53 and the output gear 52, thereafter, adjustment of the backlash between the input gear 51 and the middle gear 53 can be carried out only by rotating the motor flange 46.

Fifth Embodiment

Figure 9:
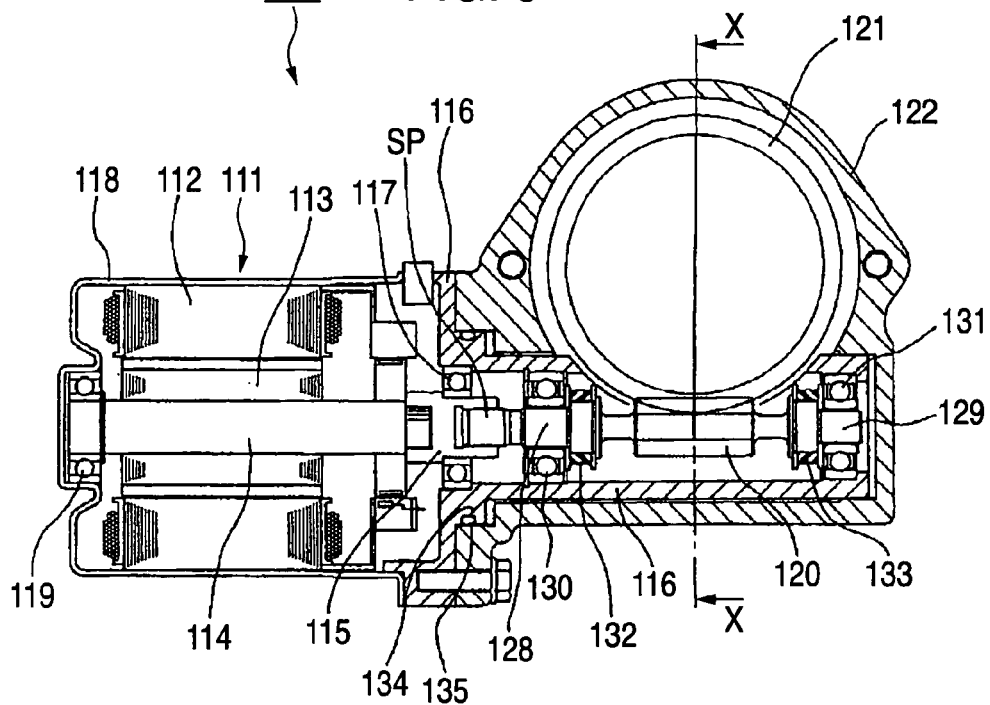
FIG. 9 is a sectional view of an essential portion showing a fifth embodiment of the invention.

Next, an electric power steering apparatus according to fifth embodiment of the invention will be explained in reference to FIG. 9 and FIG. 10. Further, according to the embodiment, a worm gear speed reducing mechanism using a worm and a worm wheel is adopted.

In the electric power steering apparatus 110 according to the fifth embodiment, an assisting motor 111 is provided with a stator 112 and a rotor 113, and an extended portion 115 is fixed to one end of the motor shaft 114 fixed to the rotor 113. The extended portion 115 of the motor shaft 114 is supported by a bearing 117 held by the motor flange 116, other end of the motor shaft 114 is supported by a bearing 119 held by a motor housing 118, and the motor shaft 114 is rotatably supported.

Figure 10:
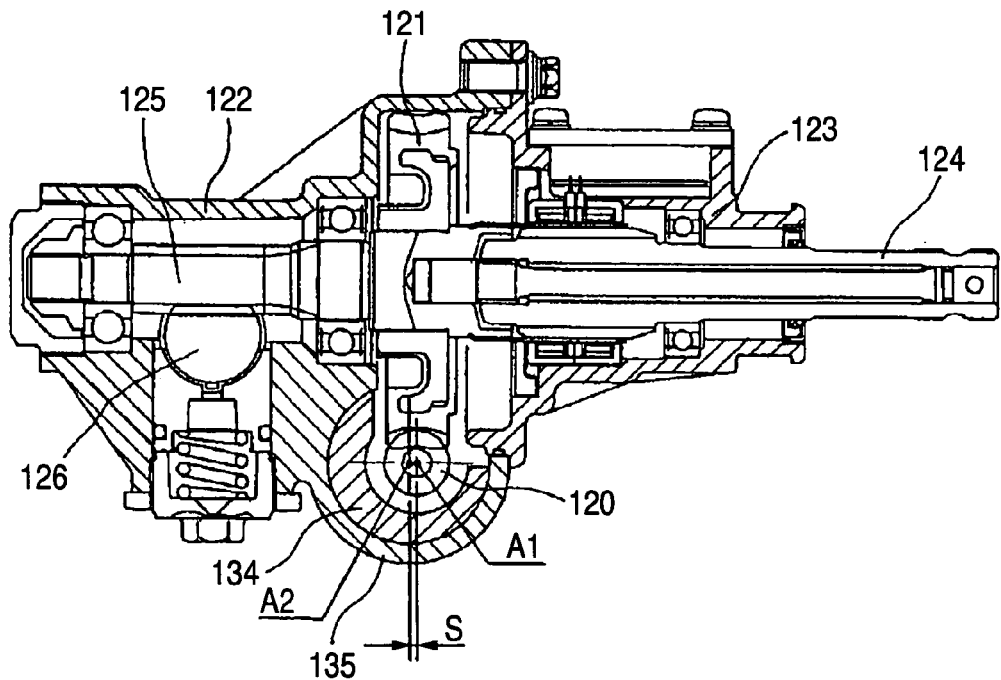
FIG. 10 is a sectional view taken along a line X-X of FIG. 9.

In reference to FIG. 10, the worm 120 and the worm wheel 121 are held at inside of a housing constituted by a rack shaft housing 122 and a steering shaft housing 123. The pinion 125 formed at an extended portion of a steering shaft 124 attached with the worm wheel 121 and a rack shaft 126 brought in mesh with the pinion 125 are contained in the rack shaft housing 123 and the motor flange 116 is rotatably mounted thereto. The constitution relates to adjustment of a backlash explained later.

A shaft 128 and a shaft 129 of the worm 120 are supported by a bearing 130 and a bearing 131 held by the motor flange 116, rubber dampers 132 and 133 are interposed between the shaft 128 and the shaft 129 of the worm 120 and the bearing 130 and the bearing 131 to alleviate impact in an axial direction transmitted from the worm wheel 121 to the worm 120 and prevent rattling in the axial direction.

The extended portion 115 of the motor shaft 114 and the shaft 128 of the worm 120 are subjected to spline coupling SP.

In the above-described constitution, a driving rotational force of assisting motor 111 driven by a control apparatus, not illustrated, based on the steering torque of the steering shaft detected by the torque detecting apparatus 15b (refer to FIG. 1) is transmitted to the rack shaft 126 via the worm 120, the worm wheel 121 and the pinion 125 and the rack shaft 126 is moved in the axial direction to change the direction of the wheel to carry out steering.

Next, an explanation will be given of adjustment of a backlash between the worm 120 and the worm wheel 121. A cylindrical member 134 of the motor flange 116 is rotatably fitted to a cylindrical recess portion 135 of the rack shaft housing 112. Further, the motor flange 116 supports the shaft 128 and the shaft 129 of the worm 120 by the bearings 130 and 131 arranged at inside thereof. An axis center A1 of the shaft 128 and the shaft 129 of the worm 120 and an axis center A2 of the cylindrical member 134 formed at an outer portion of the motor flange 116 are eccentric from each other by a dimension s as shown by FIG. 10.

Therefore, when the cylindrical member 134 of the motor flange 116 is rotated in a state of being mounted to the cylindrical recess portion 135 of the rack shaft housing 122, the axis center A1 of the worm 120 is rotated around the axis center A2 of the cylindrical member 134 of the motor flange 116 (refer to FIG. 10), an interval between the axis center of the worm 120 and the axis center of the worm wheel 121 is varied to change a depth of bringing the worm 120 and a worm wheel 121 in mesh with each other and therefore, adjustment of the backlash can be carried out.

Sixth Embodiment

Figure 11:
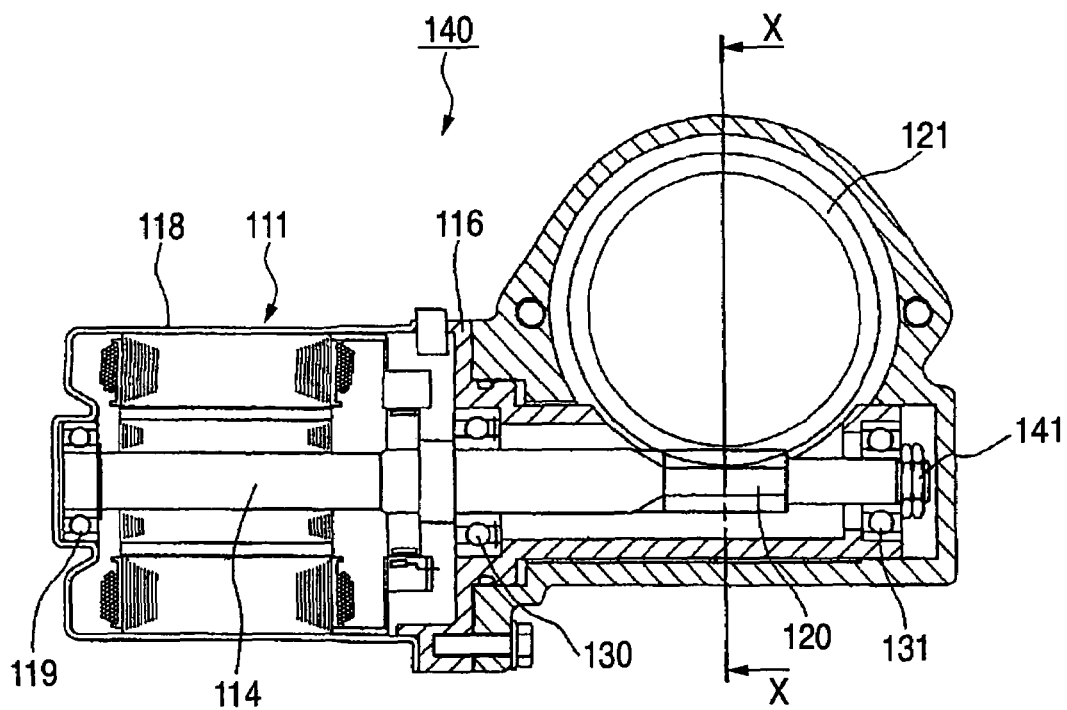
FIG. 11 is a sectional view of an essential portion showing a sixth embodiment of the invention.

Next, an electric power steering apparatus according to a sixth embodiment of the invention will be explained in reference to FIG. 1. Further, a worm gear speed reducing mechanism using a worm and a worm wheel is adopted also in the embodiment. Further, a sectional view taken along a line □-□ of FIG. 11 is the same as that shown in FIG. 10 and therefore, illustration thereof will be omitted.

A point of difference of the sixth embodiment from the fifth embodiment resides in that the motor shaft 114 and the worm 120 are integrally constituted and supported by three pieces of bearings of the bearing 119 held by the motor housing 118, and the bearing 130 and the bearing 131 held by the motor flange 116, and prepressure is applied to the bearing 130 and the bearing 131 by a nut 141 provided at a shaft held of the worm 120 to prevent rattling in an axial direction. The other constitution is the same as that of the fifth embodiment and therefore, the same members are attached with the same notations and a detailed explanation thereof will be omitted.

In the electric power steering apparatus 140 according to the sixth embodiment, adjustment of the backlash is also the same as that of the fifth embodiment, when the cylindrical member 134 of the motor flange 116 is rotated in the state of being mounted to the cylindrical recess portion 135 of the rack shaft housing 122, the axis center A1 of the worm 120 is rotated around the axis center A2 of the cylindrical member 134 of the motor flange 116 (refer to FIG. 10), the interval between the axis center of the worm 120 and the axis center of the worm wheel 121 is varied to change the depth of bringing the worm 120 and the worm wheel 121 in mesh with each other and therefore, adjustment of the backlash can be carried out.

Seventh Embodiment

Figure 12:
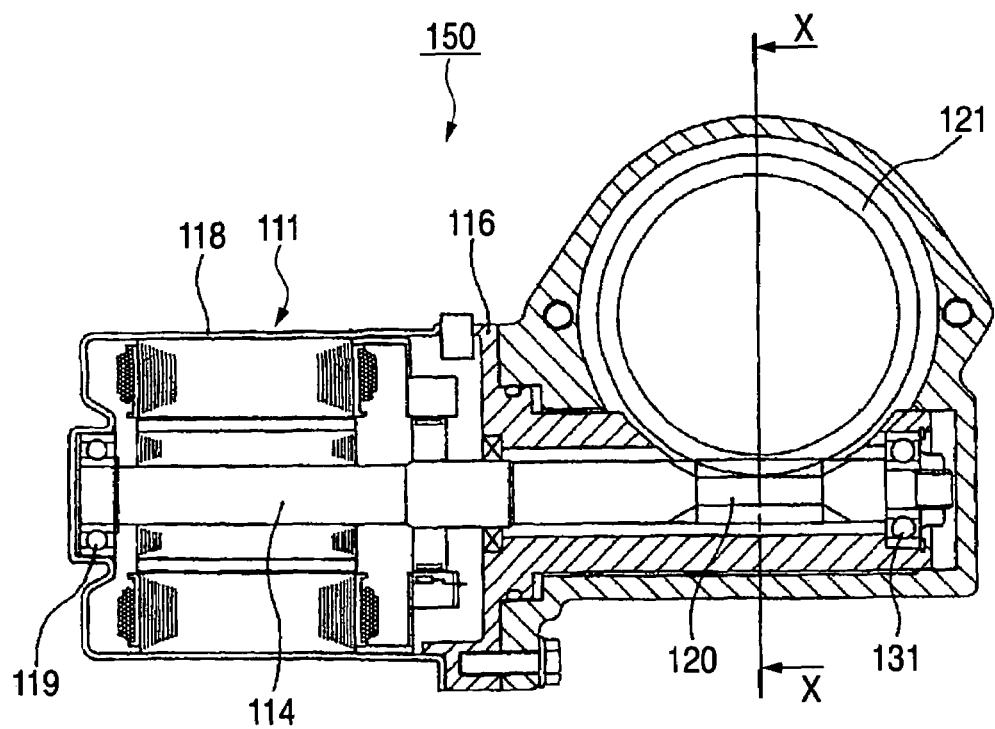
FIG. 12 is a sectional view of an essential portion showing a seventh embodiment of the invention.

Next, an electric power steering apparatus according to a seventh embodiment of the invention will be explained in reference to FIG. 12. Further, a worm gear speed reducing mechanism using a worm and a worm wheel is adopted also in the embodiment. Further, a sectional view taken along a line X-X of FIG. 12 is the same as that shown in FIG. 10 and therefore, illustration thereof will be omitted.

A point of difference of the seventh embodiment from the fifth embodiment resides in that the motor shaft 114 and the worm 120 are integrally constituted and held by two pieces of bearings of the bearing 119 held by the motor housing 118 and the bearing 131 held by the motor flange 116, and the bearing 131 is constituted by a four points contact ball bearing to prevent rattling in the axial direction. The other constitution is the same as that of the fifth embodiment and therefore, the same members are attached with the same notations and a detailed explanation thereof will be omitted.

In the electric power steering apparatus 150 according to the seventh embodiment, adjustment of the backlash is also the same as that of the fifth embodiment, when the cylindrical member 134 of the motor flange 116 is rotated in the state of being mounted to the cylindrical recess portion 135 of the rack shaft housing 122, the axis center A1 of the shaft 128 and the shaft 129 of the worm 120 is rotated around the axis center A2 of the cylindrical member 134 of the motor flange 116, the interval between the axis center of the worm 120 and the axis center of the worm wheel 121 is varied to change the depth of bringing the worm 120 and the worm wheel 121 in mesh with each other and therefore, adjustment of the backlash can be carried out.

Eighth Embodiment

Figure 13:
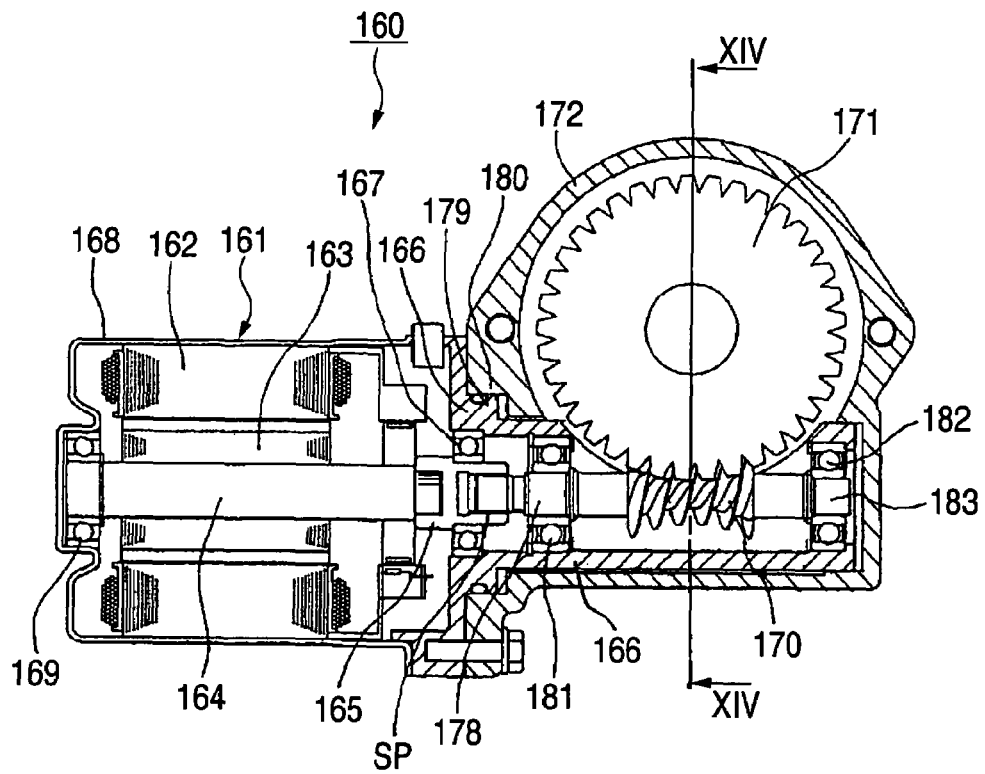
FIG. 13 is a sectional view of an essential portion showing an eighth embodiment of the invention.

Next, an electric power steering apparatus according to an eighth embodiment of the invention will be explained in reference to FIG. 13 and FIG. 14. Further, a worm gear speed reducing mechanism using a saddle type worm and the worm wheel is adopted.

In the electric power steering apparatus 160 according to the eighth embodiment, an assisting motor 161 is provided with a stator 162 and a rotor 163, and an extended portion 165 is fixed to one end of the motor shaft 164 fixed to the rotor 163. The extended portion 165 of the motor shaft 164 is supported by a bearing 167 held by the motor flange 166 and the motor shaft 164 is rotatably supported.

Figure 14:
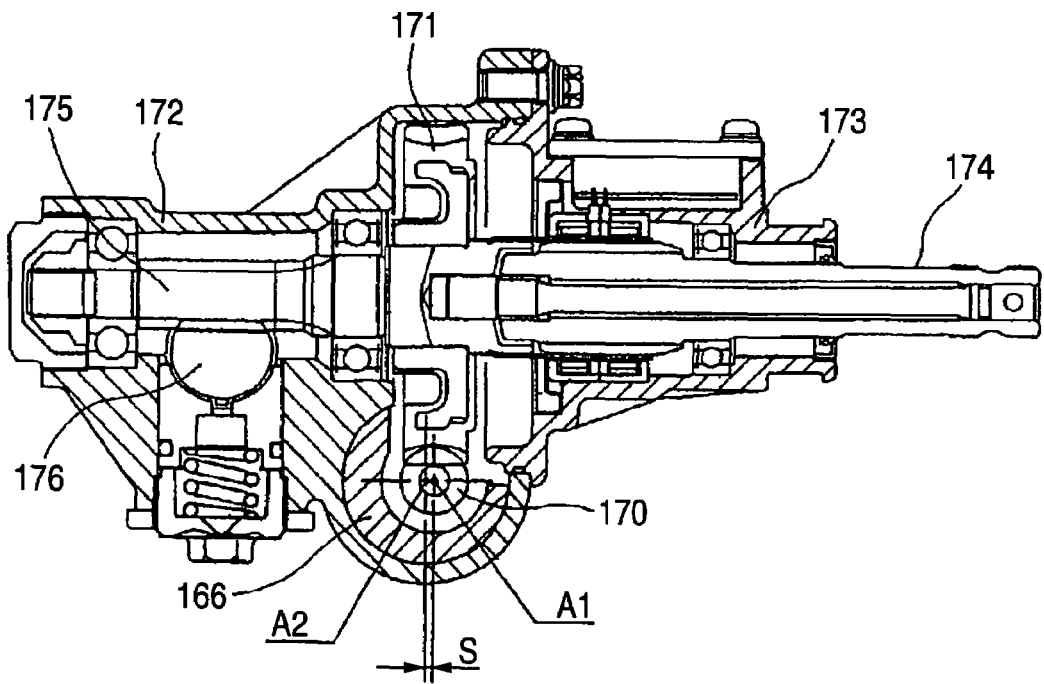
FIG. 14 is a sectional view taken along a line XIV-XIV of FIG. 13.

In reference to FIG. 14, according to the electric power steering apparatus 160 of the eighth embodiment, the saddle type worm 170 and the worm wheel 171 are held at inside of a housing constituted by a rack shaft housing 172 and a steering shaft housing 173. The pinion 175 formed at an extended portion of a steering shaft 174 attached with the worm wheel 171 and a rack shaft 176 brought in mesh with the pinion 175 are contained in the rack shaft housing 172 and further, the motor flange 166 is rotatably mounted thereto. The constitution relates to adjustment of the backlash explained later.

The extended portion 165 of the motor shaft 164 and a shaft 178 of the saddle type worm 170 are subjected to spline coupling SP.

In the above-described constitution, a driving rotational force of the assisting motor 161 driven by a control apparatus, not illustrated, based on the steering torque of the steering shaft detected by the torque detecting apparatus 15b (refer to FIG. 1) is transmitted to the rack shaft 176 via the saddle type worm 170, the worm wheel 171 and the pinion 175, and the rack shaft 176 is moved in an axial direction to change the direction of the wheel to carry out steering.

An explanation will be given of adjustment of a backlash between the saddle type worm 170 and the worm wheel 171. A cylindrical member 179 of the motor flange 166 is rotatably attached to a cylindrical recess portion 180 of the rack shaft housing 172. Further, the motor flange 166 supports the shaft 178 and a shaft 183 of the saddle type worm 170 by a bearing 181 and a bearing 182 arranged at inside thereof. An axis center A1 of the shaft 178 and the shaft 183 of the saddle type worm 170 and an axis center A2 of the cylindrical member 179 formed at an outer portion of the motor 166 are eccentric from each other by a dimension s as shown by FIG. 14.

Therefore, when the cylindrical member 179 of the motor flange 166 is rotated in a state of being mounted to the cylindrical recess portion 180 of the rack shaft housing 172, the axis center A1 of the shaft 178 and the shaft 183 of the saddle type worm 170 is rotated around the axis center A2 of the cylindrical member 179 of the motor flange 166, an interval between the axis center of the saddle type worm 170 and the axis center of the worm wheel 171 is varied to change a depth of bringing the saddle type worm 170 and the worm wheel 171 in mesh with each other and adjustment of the backlash can be carried out.

Ninth Embodiment

Figure 15:
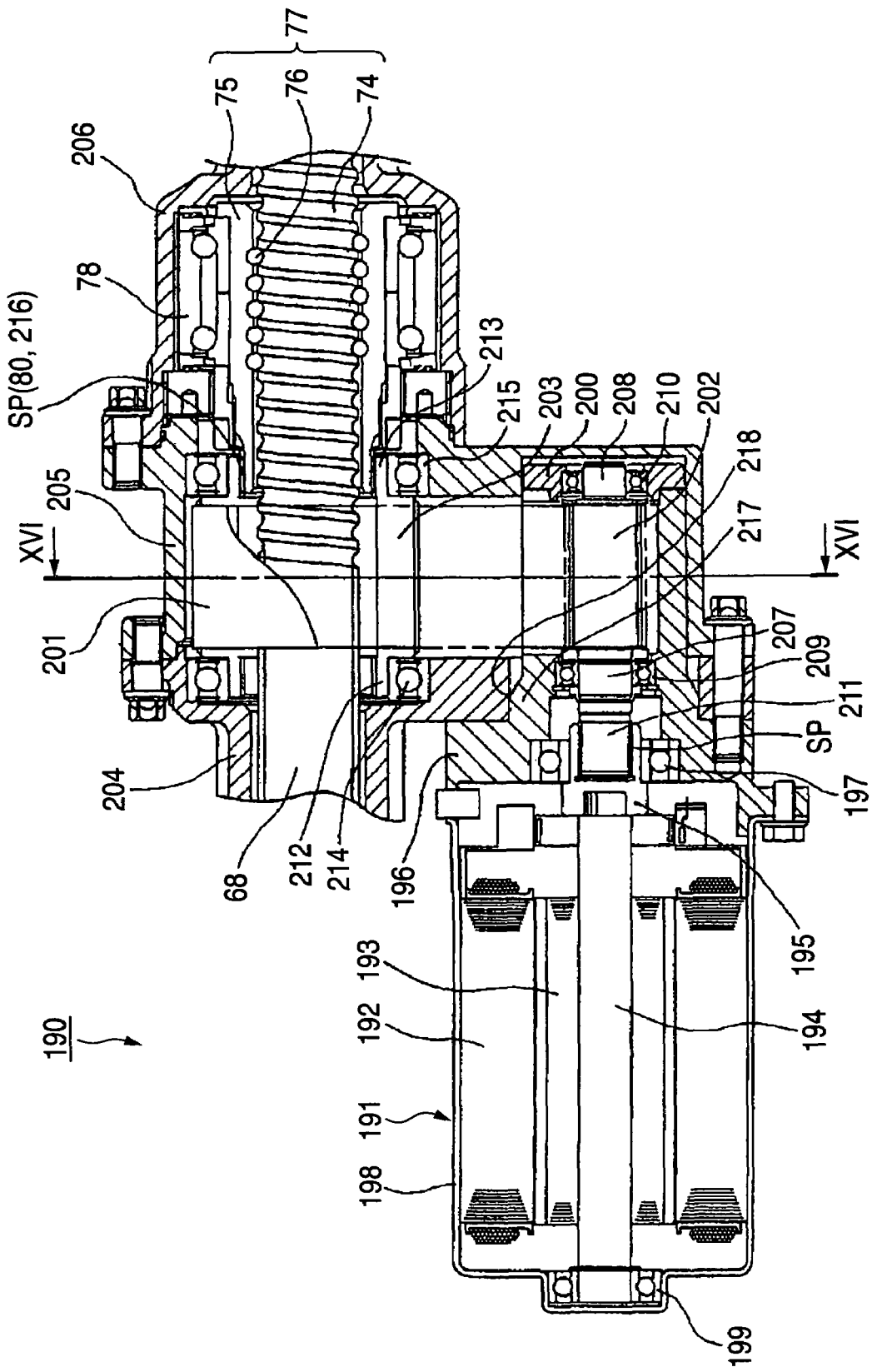
FIG. 15 is a sectional view of an essential portion showing a ninth embodiment of the invention.

Next, an electric power steering apparatus according to a ninth embodiment of the invention will be explained in reference to FIG. 15 and FIG. 16. Further, according to the embodiment, a belt speed reducing apparatus using a drive belt is adopted. Further, a steering shaft, a pinion rack mechanism and a ball screw mechanism are the same as those of the second embodiment and therefore, the same members are attached with the same notations and a detailed explanation thereof will be omitted.

In the electric power steering apparatus 190 according to the ninth embodiment, the assisting motor 191 is provided with a stator 192 and a rotor 193, and an extended portion 195 is fixed to one end of the motor shaft 194. The extended portion of the motor shaft 194 is supported by a bearing 197 held by a motor flange 196, other end of the motor shaft 194 is supported by a bearing 199 held by a motor housing 198, and the motor shaft 194 is rotatably supported. A motor flange lid 200 is attached to an end face of the motor flange 196. This is for facilitating to mount the drive belt 201, mentioned later.

The drive pulley 202 and the driven pulley 203 are held at inside of a housing constituted by a rack housing 204, a pulley housing 205 and a rack housing 206 on a side of a ball screw.

A shaft 207 and a shaft 208 of the drive pulley 202 are respectively supported by a bearing 209 held by the rack housing 204 and a bearing 210 held by the pulley housing 205. Further, an extended portion 211 of the shaft 207 of the drive pulley 202 and the extended portion 195 of the motor shaft 194 are subjected to spline coupling SP.

The driven pulley 203 is formed in a cylindrical shape and is penetrated with the rack shaft 68 at inside thereof. A shaft 212 and a shaft 213 formed at outer sides of both end portions in an axial direction of the driven pulley 203 are respectively supported by a bearing 214 held by the rack housing 204 and a bearing 215 held by the pulley housing 205. Further, a spline groove 216 is formed at an inner face in a cylindrical shape of the driven pulley 203.

Figure 16:
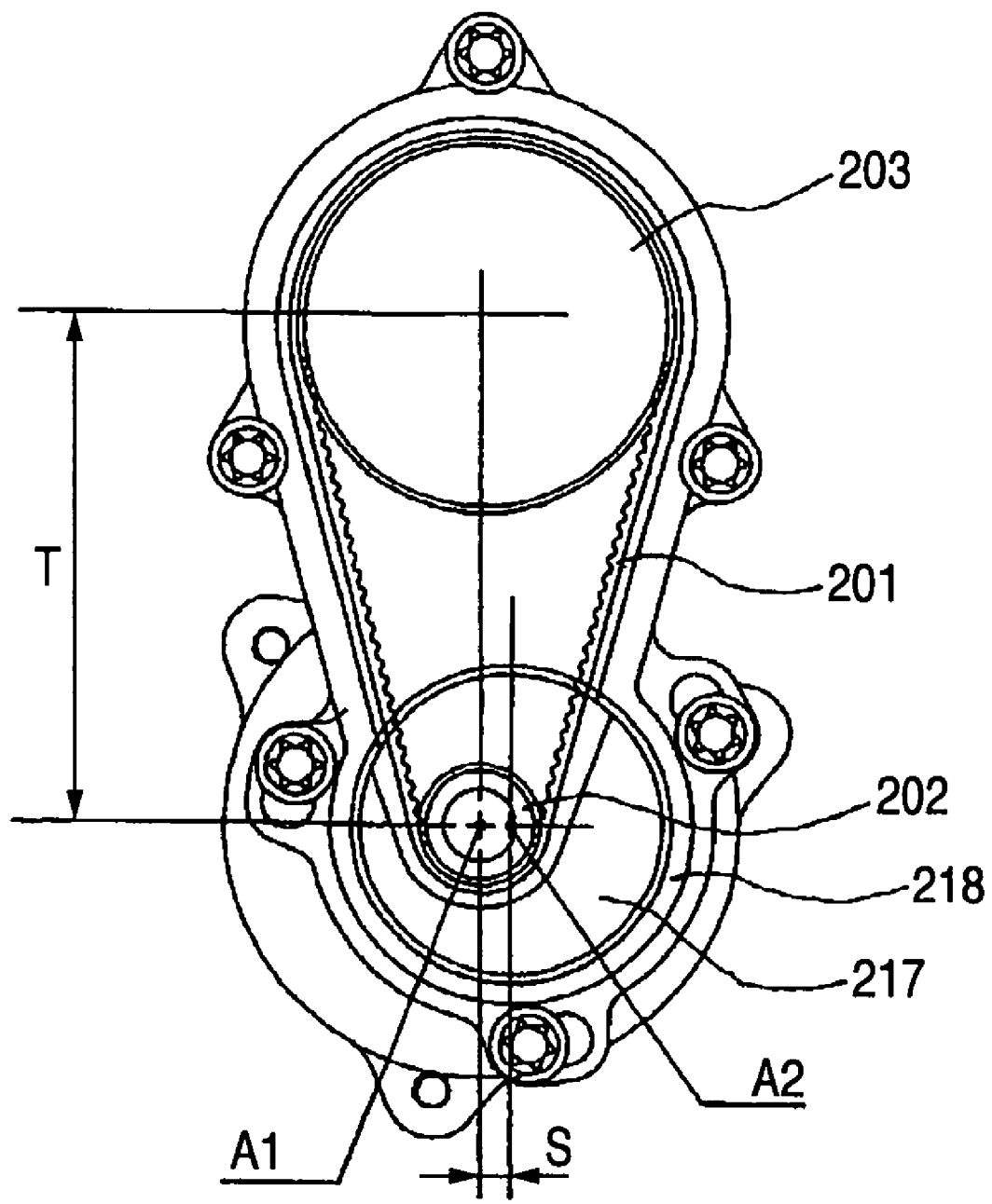
FIG. 16 is a sectional view taken along a line XVI-XVI of FIG. 15.

As shown by FIG. 16, a portion of an inner side of the motor flange 196 (portion surrounded by the drive belt 201) is notched to open as a path of the drive belt 201, the drive belt 201 is hung over between the drive pulley 202 and the driven pulley 203 and rotation of the drive pulley 202 is transmitted to the driven pulley 203 via the drive belt 201.

When the drive belt 201 is made to wrap between the drive pulley 202 and the driven pulley 203, the drive belt 201 can be made to wrap between the drive pulley 202 and the driven pulley 203 by removing the pulley housing 205 from the rack housing 204 and removing the motor flange lid 200 at the end face of the motor flange 196.

The male screw portion 74 is formed at the rack shaft 68 coupled with a steering shaft, not illustrated, via a pinion rack mechanism, the nut 75 is arranged on the outer side of the male screw portion 74, and a number of the balls 76 are inserted to fit to between the male screw portion 74 of the rack shaft 68 and a female screw portion of the nut 75 to constitute the ball screw mechanism 77.

The nut 75 of the ball screw mechanism 77 is rotatably supported by the bearing 78 arranged at inside of the rack housing 206. The spline projected streak 80 is formed on the outer side of the extended portion of one end of the nut 75 and the spline projected portion 80 and the spline groove 216 formed at an inner face of the driven pulley 203 are subjected to spline coupling SP.

In the above-described constitution, a driving rotational force of the assisting motor 191 driven by a control apparatus, not illustrated, based on the steering torque of the steering shaft detected by the torque detecting apparatus 15b (refer to FIG. 1) is transmitted to the nut 75 of the ball screw mechanism 77 via the drive pulley 202 and the driven pulley 203. Further, the rack shaft 68 is moved in the axial direction by rotating the nut 75 to change the direction the wheel to carry out steering.

Next, an explanation will be given of adjustment of a tension of the drive belt 201 hung over between the drive pulley 202 and the driven pulley 203. In the speed reducing mechanism using the drive belt, it is necessary to set the tension of the drive belt in a proper range, since the dispersion among products of the drive belt is larger than that of a gear and therefore, it is difficult to set the tension of the drive belt in the proper range by matching the drive belt and the pulleys, further, also in view of integrating operation, there is needed a constitution capable of adjusting a distance between axis centers of the input pulley and the output pulley.

Adjustment of the tension of the drive belt 201 hung over between the drive pulley 202 and the driven pulley 203 is carried out by the following constitution. That is, a cylindrical member 217 of the motor flange 196 is rotatably fitted to a cylindrical recess portion 218 of the rack housing 204. Further, the motor flange 196 supports the drive pulley 202 by the bearing 209 arranged at inside thereof. An axis center A1 of the drive pulley 202 and an axis center A2 of the cylindrical member 217 arranged at an outer portion of the motor flange 196 are eccentric from each other by a dimension s as shown by FIG. 16.

Therefore, when the cylindrical member 217 of the motor flange 196 is rotated in a state of being mounted to the cylindrical recess portion 218 of the rack housing 204, the axis center A1 of the drive pulley 202 is rotated around the axis center A2 of the cylindrical member 217 of the motor flange 196, a distance T between the axis centers of the drive pulley 202 relative to the driven pulley 203 is changed and adjustment of the tension of the drive belt 201 can be carried out.

Tenth Embodiment

Figure 17:
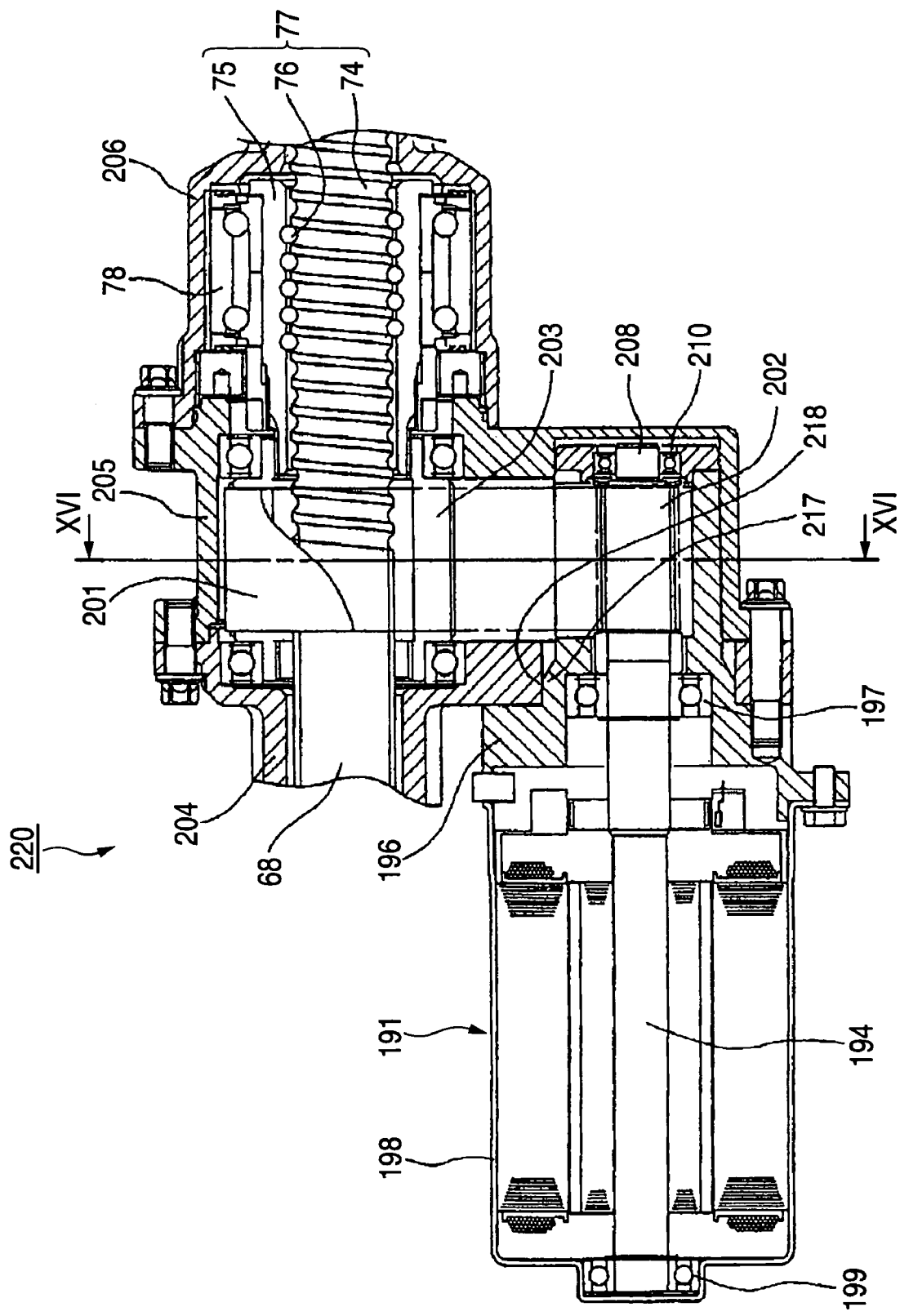
FIG. 17 is a sectional view of an essential portion showing a tenth embodiment of the invention.

Next, an electric power steering apparatus according to a tenth embodiment will be explained in reference to FIG. 17. Further, according to the embodiment, a belt reducing apparatus using a drive belt is adopted. Further, a sectional view taken along a line XVI-XVI of FIG. 17 is the same as that shown in FIG. 16 and therefore, illustration thereof will be omitted.

A point of difference of the tenth embodiment from the ninth embodiment of the electric power steering apparatus 220 resides in that the motor shaft 194 and the drive pulley 202 are integrally constituted and held by three pieces of the bearing 199, the bearing 197 and the bearing 210. The other constitution is the same as that of the ninth embodiment and therefore, the same members are attached with the same notations and a detailed explanation thereof will be omitted.

Also adjustment of the tension of the drive belt 201 hung over between the drive pulley 202 and the driven pulley 203 is the same as that of the ninth embodiment, when the cylindrical member 217 of the motor flange 196 is rotated in the state of being mounted to the cylindrical recess portion 218 of the rack housing 204 (refer to FIG. 16), the axis center A1 of the drive pulley 202 is rotated around the axis center A2 of the cylindrical member 217 of the motor flange 196, the distance T between the axis centers of the drive pulley 202 relative to the driven pulley 203 is changed, and the tension of the drive belt 201 can be adjusted.

Eleventh Embodiment

Figure 18:
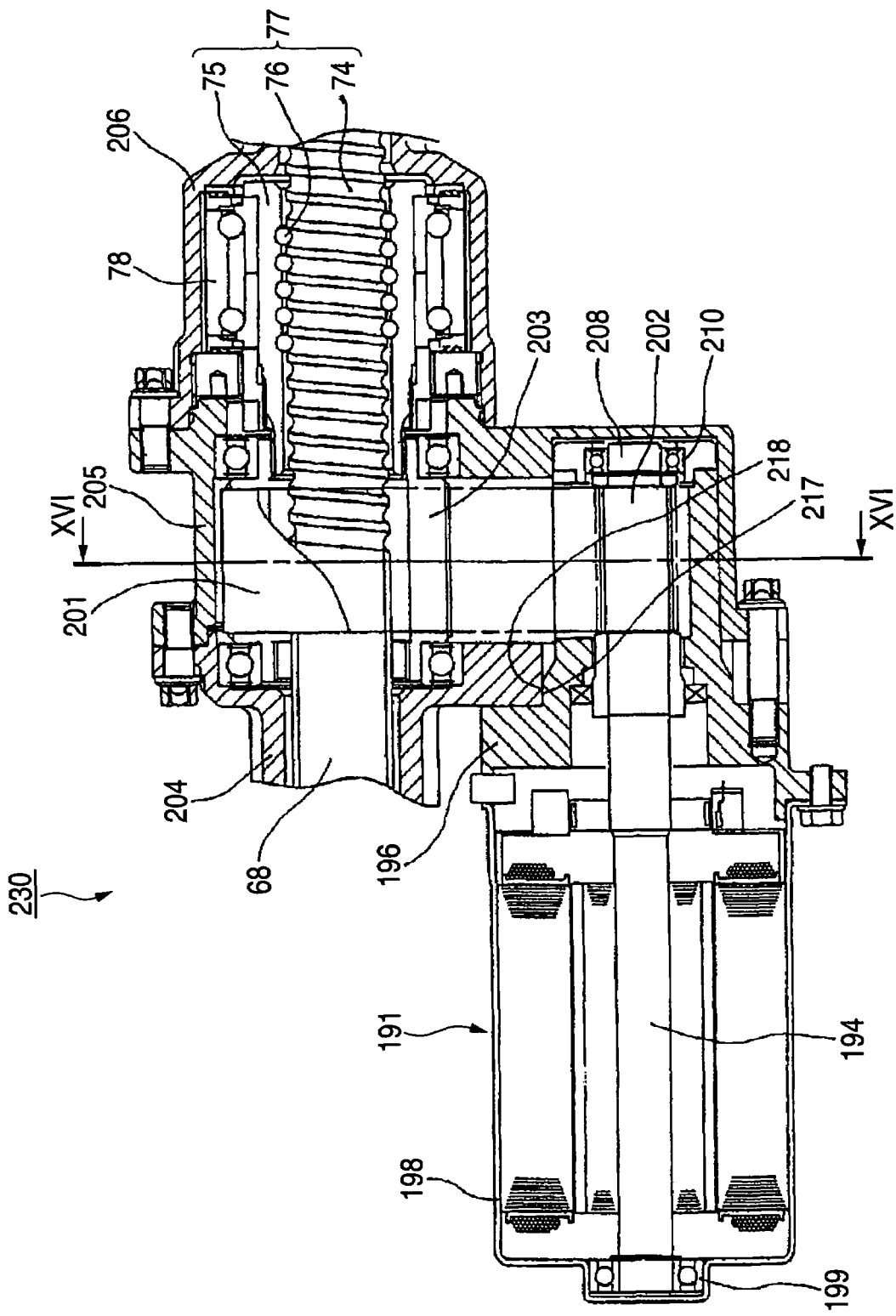
FIG. 18 is a sectional view of an essential portion showing an eleventh embodiment of the invention.
Figure 19:
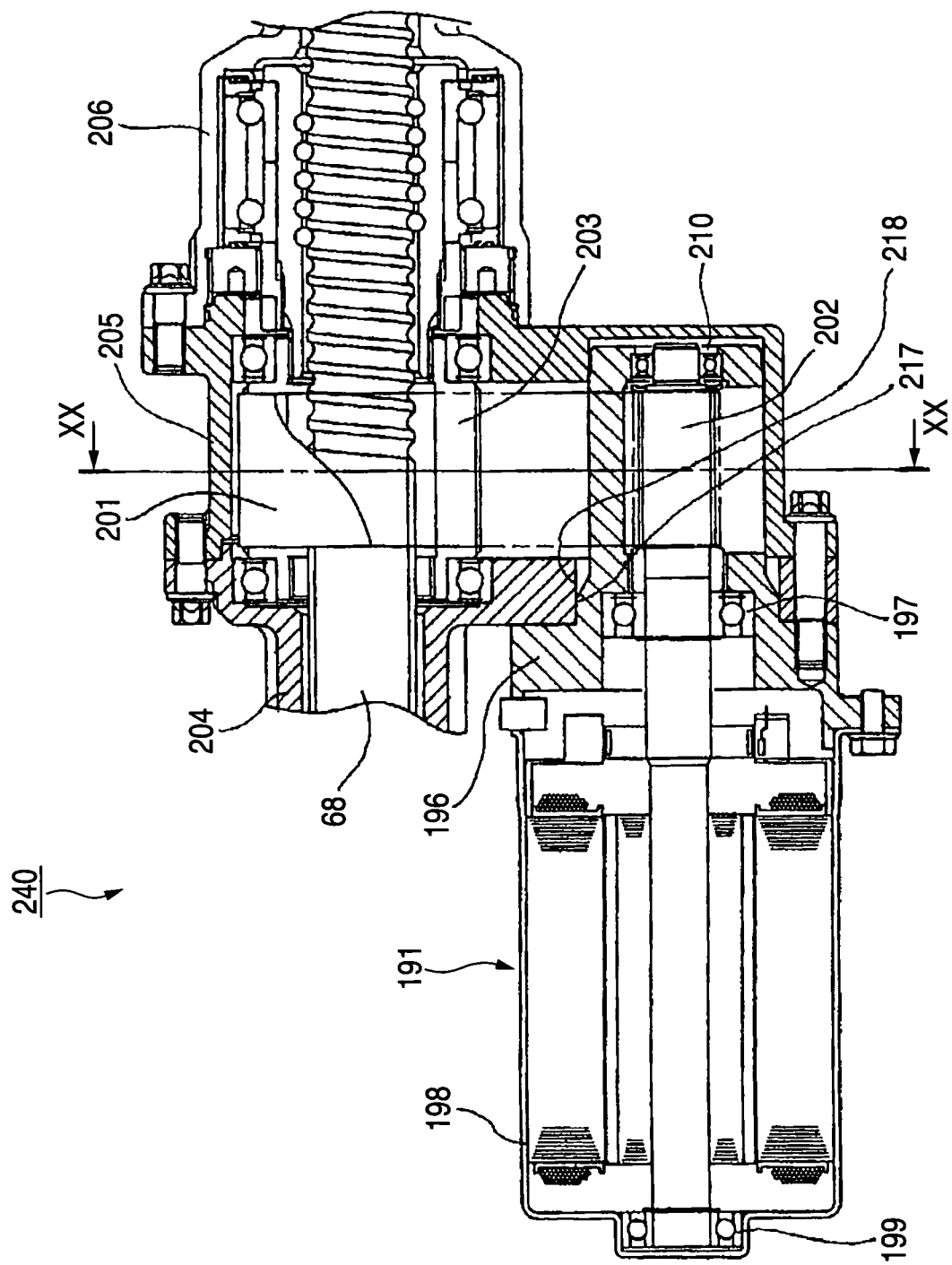
FIG. 19 is a sectional view of an essential portion showing a twelfth embodiment of the invention.

Next, an electric power steering apparatus according to an eleventh embodiment of the invention will be explained in reference to FIG. 18. Further, according to the embodiment, a belt speed reducing apparatus using a drive belt is adopted. Further, a sectional view taken along a line XVI-XVI of FIG. 18 is the same as that shown in FIG. 16 and therefore, illustration thereof will be omitted.

A point of difference of the electric power steering apparatus 230 from the ninth embodiment resides in that the motor shaft 194 and the drive pulley 202 are integrally constituted and is held by two pieces of the bearings 199 and 210. The other constitution is the same as that of the ninth embodiment and therefore, the same members are attached with the same notations and a detailed explanation thereof will be omitted.

Also adjustment of the tension of the drive belt 201 hung over between the drive pulley 202 and the driven pulley 203 is the same as that of the ninth embodiment, when the cylindrical member 217 of the motor flange 196 is rotated in the state of being mounted to the cylindrical recess portion 218 of the rack housing 204 (refer to FIG. 16), the axis center A1 of the drive pulley 202 is rotated around the axis center A2 of the cylindrical member 217 of the motor flange 196, the distance T between the axis centers of the drive pulley 202 relative to the driven pulley 203 is changed, and adjustment of the tension of the drive belt 201 can be carried out.

Twelfth Embodiment

Next, an electric power steering apparatus according to a twelfth embodiment of the invention will be explained in reference to FIG. 19 through FIG. 22. Further, according to the embodiment, a belt speed reducing apparatus using a drive belt is adopted.

A point of difference of the electric power steering apparatus 240 according to the twelfth embodiment from the tenth embodiment resides in that an outer side of the motor flange 196 is opened. The other constitution is the same as that of the tenth embodiment and therefore, the same members are attached with the same notations and a detailed explanation thereof will be omitted.

In the electric power steering apparatus 240, the motor shaft 194 and the drive pulley 202 are integrally constituted and held by three pieces of the bearings 199, 197 and 210.

Figure 20:
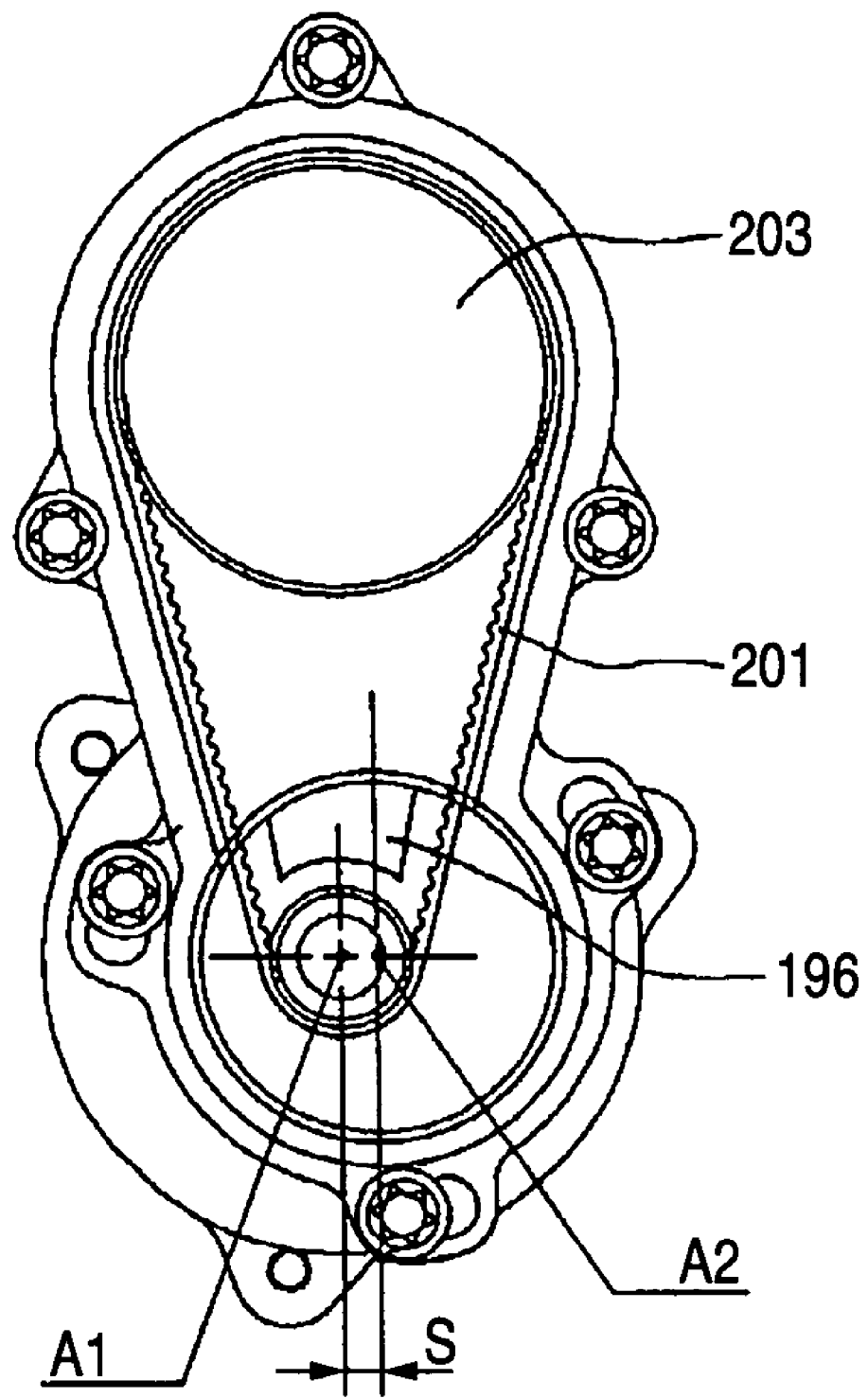
FIG. 20 is a sectional view taken along a line XX-XX of FIG. 19.

As shown by FIG. 20, a large portion of the outer side of the motor flange 196 (a portion disposed on an outer side of a portion surrounded by the drive belt 201) is notched to open as a path of the drive belt 201, the drive belt 201 is hung over between the drive pulley 202 and the driven pulley 203, and rotation of the drive pulley 202 is transmitted to the driven pulley 203 via the drive belt 201.

Also adjustment of the tension of the drive belt 201 hung over between the drive pulley 202 and the driven pulley 203 is the same as that of the tenth embodiment, when the cylindrical portion 217 of the motor flange 196 is rotated in the state of being mounted to the cylindrical recess portion 218 of the rack housing 204, the axis center A1 of the drive pulley 202 is rotated around the axis center A2 of the cylindrical member 217, the distance T between the axis centers of the drive pulley 202 relative to the driven pulley 203 is changed, and adjustment of the tension of the drive belt 201 can be carried out.

Figure 21:
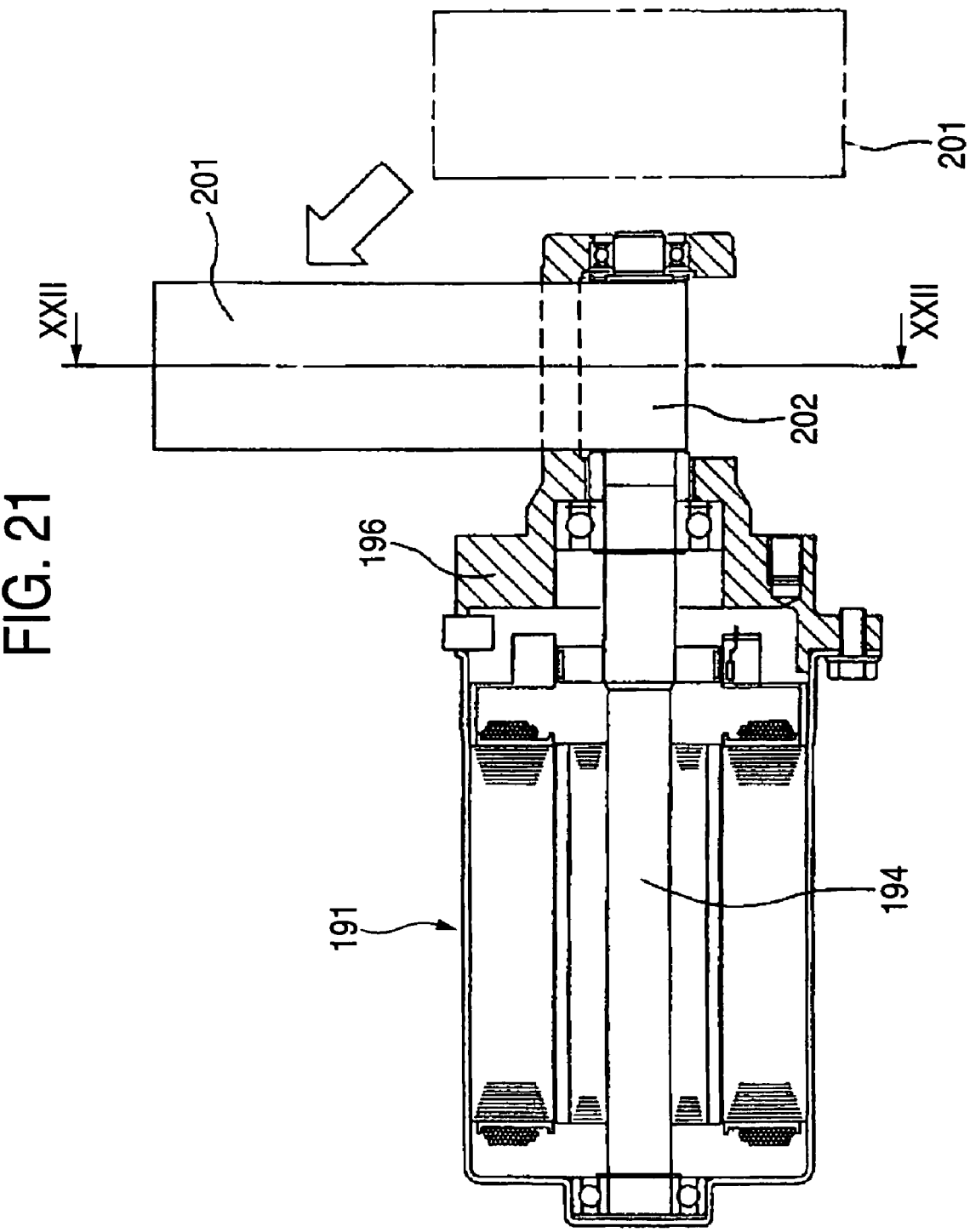
FIG. 21 is a cross-sectional view for explaining operation of mounting a drive belt by removing a motor flange portion from a rack housing of FIG. 19.
Figure 22:
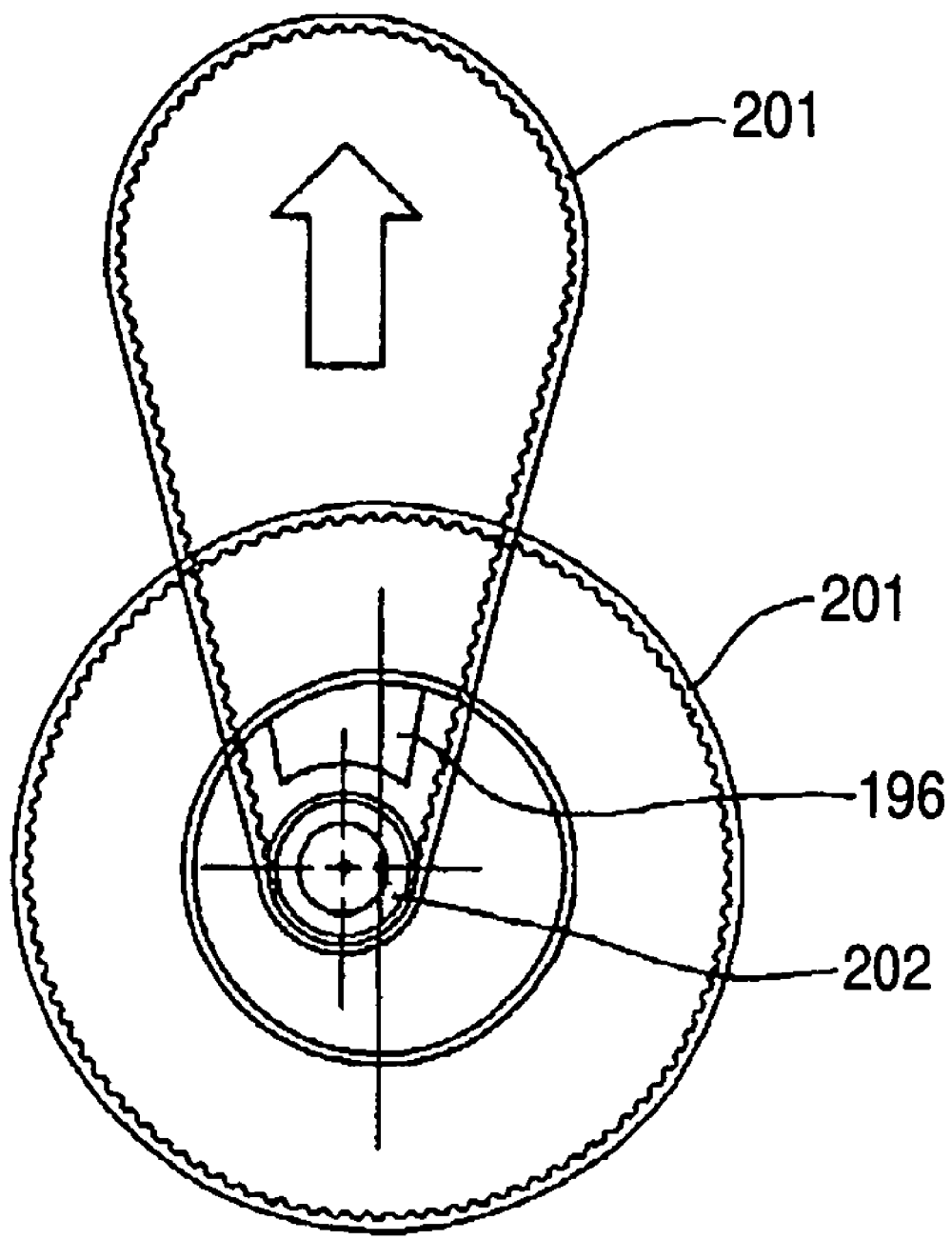
FIG. 22 is a sectional view taken along a line XXII-XXII of FIG. 21.

As shown by FIG. 21 and FIG. 22, when the drive belt 201 is hung over between the drive pulley 202 and the driven pulley 203, first, the assisting motor 191 is attached to the motor flange 196, and the drive belt 201 is hung over the drive pulley 202. Next, the pulley housing 205 may be removed from the rack housing 204, the drive belt 201 may be hung over the driven pulley 203, the pulley housing 205 may be mounted to the rack housing 204, and the motor flange 196 may be fixed to the pulley housing 205.

According to the electric power steering apparatus 240, the motor flange 196 can be attached to the pulley housing 205 without disassembling the motor flange 196 attached with the assisting motor 191 and the driving belt 201, further, it is not necessary to provide the flange lid at the end portion of the motor flange 196, a number of parts can be reduced and a number of integrating steps can be reduced.

Thirteenth Embodiment

Figure 24:
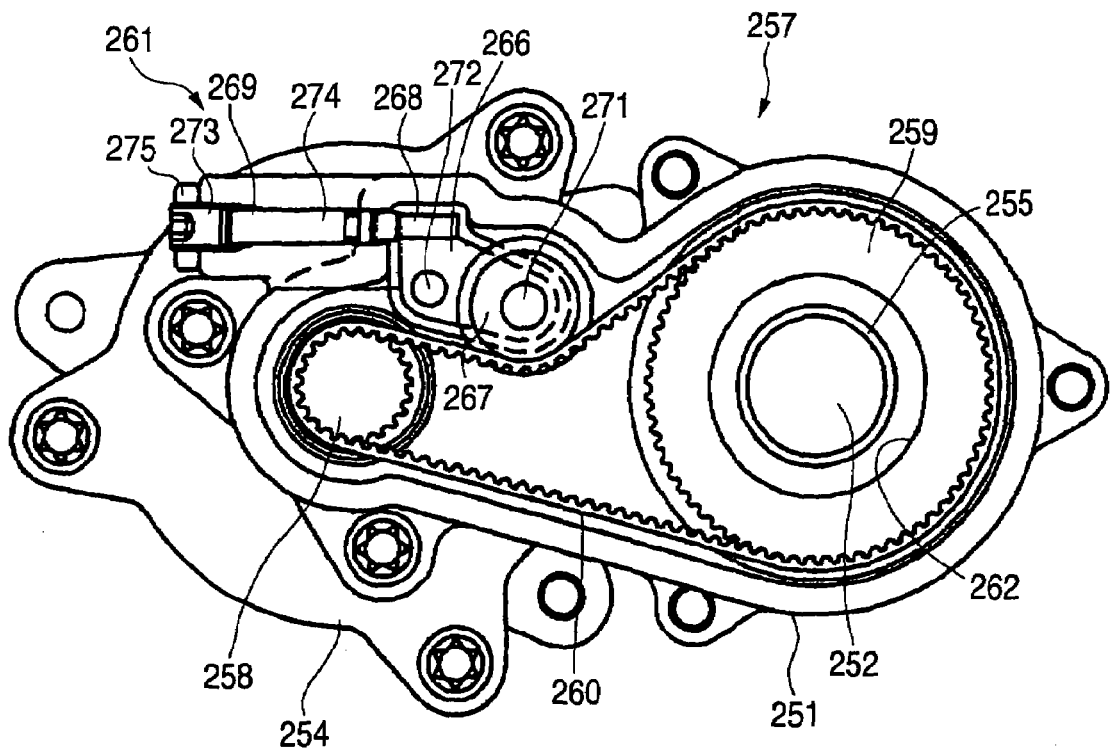
FIG. 24 is a sectional view taken along a line XXIV-XXIV of FIG. 23.
Figure 25:
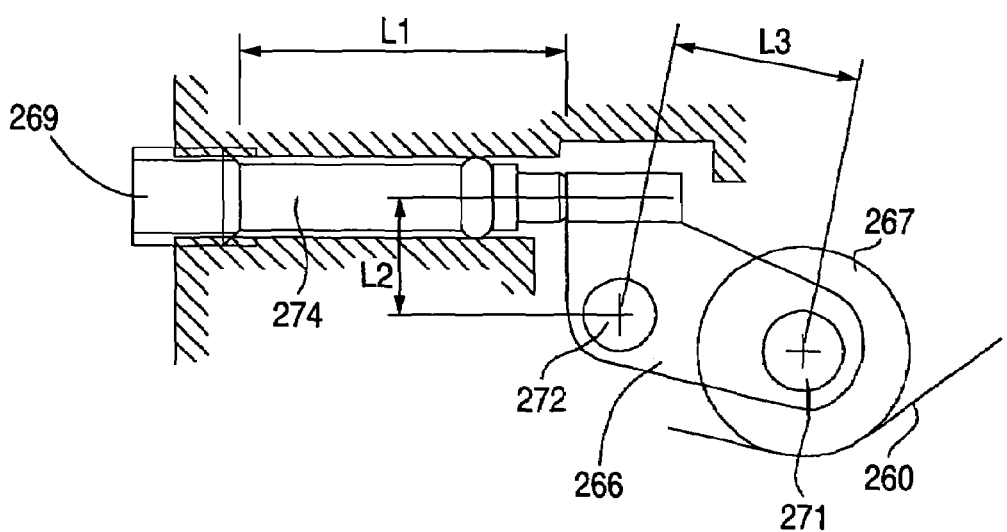
FIG. 25 is a view enlarging an essential portion explaining a tension adjusting mechanism portion.

Next, a belt speed reducing apparatus for an electric power steering apparatus and the electric power steering apparatus according to a thirteenth embodiment of the invention will be explained in reference to FIG. 23 through FIG. 25.

The electric power steering apparatus 250 according to the thirteenth embodiment is provided with the housing 251, the rack shaft 252, the nut 253, and the assisting motor 254.

The rack shaft 252 is supported by the housing 251 to be unable to rotate and movably in an axial direction (up and down direction in FIG. 23), and is provided with the male screw portion 255 constituting a ball screw mechanism along with the rack portion 21 (refer to FIG. 1) having the rack teeth with which the pinion 15a (refer to FIG. 1) rotated by the handle (steering wheel) is brought in mesh.

A female screw portion of the nut 253 is screwed with the male screw portion 255 via the nut, and the nut 253 is supported by a bearing 256 rotatably relative to the housing 251 and unmovably in the axial direction. A circulating ball is interposed between the male screw portion 255 and the female screw portion of the nut 253 to thereby constitute the ball screw mechanism. When the assisting motor 254 is rotated, the rotation is transmitted to the nut 253 via the belt speed reducing apparatus 257 for the electric power steering apparatus to be explained successively, thereby, the rack shaft 252 is moved in the axial direction.

The belt speed reducing apparatus 257 is provided with the drive pulley 258, the driven pulley 259, the drive belt 260, and the tension adjusting mechanism 261. The drive belt 260 is hung over between the drive pulley 258 provided at the motor shaft of the assisting motor 254 and the driven pulley 259 supported by the housing rotatably and to be unable to move in the axial direction, and rotation of the assisting motor 254 is transmitted to the driven pulley 259. Glass fiber is used for a core wire of the drive belt 260 as a material. Further, according to the example, a belt formed with teeth on an inner side thereof and referred to as an assuredly moving belt or a timing belt is used for the drive belt 260. Therefore, outer sides of the drive pulley 258 and the driven pulley 259 are formed with teeth brought in mesh with the teeth.

The driven pulley 259 is provided with a through hole 262 and the through hole 262 is penetrated by the rack shaft 252. The driven pulley 259 is supported by bearings 263 and 263 rotatably relative to the housing 251 and unmovably in the axial direction. A spline groove 264 is formed of one side (lower side of FIG. 23) of the driven pulley 259 and the spline groove 264 and a spline projected streak 265 formed at the female screw 253 are subjected to spline coupling. By the spline coupling, only rotation of the driven pulley 259 is transmitted to the nut 253.

The tension adjusting mechanism 261 of the thirteenth embodiment is provided with a roller holder 266, a tension roller 267, an engaging portion 268, and a pivot adjusting member 269. The roller holder 266 pinches the tension roller 267 by side plates 270 from both sides thereof, and the side plates 270 are provided with a roller shaft 271 for rotatably supporting the tension roller 267. The roller shaft 271 is prevented from being detached by a bottom face of a recess portion provided at the housing 251.

A pivoting shaft 272 is provided at a vicinity of a center of the roller holder 266, and the pivoting shaft 272 is axially supported by a recess portion of the housing 251. The engaging portion 268 is provided on a side of the roller holder 266 opposed to the roller 267.

Figure 23:
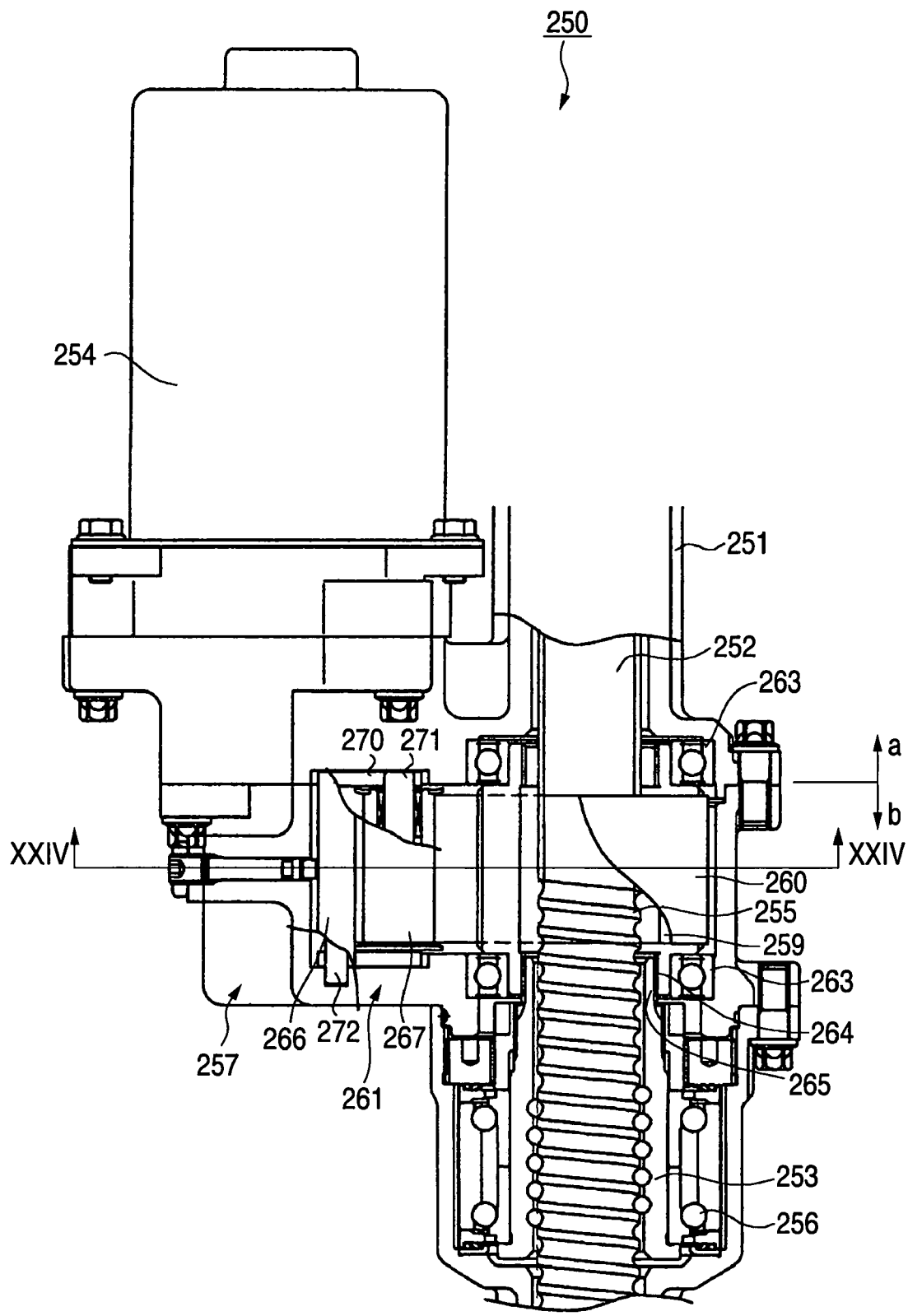
FIG. 23 is a sectional view of an essential portion showing a thirteenth embodiment of the invention.

Further, as shown by FIG. 23, the housing 251 is provided with a divided structure comprising an upper portion a and a lower portion b and both ends of the driven pulley 259 and the pivoting shaft 272 are supported respectively by the upper portion a and the lower portion b. The structure is constituted in consideration of integration.

The pivot adjusting member 269 is an adjusting member in an axial shape and is provided with a pivot adjusting male screw portion 273 at a root portion thereof and a canceling expansion portion 274 at a front end side thereof. The housing 251 (lower portion b) is formed with a through hole from outside to the engaging portion 268, and a pivot adjusting female screw portion is formed at a vicinity of an outer side opening portion of the through hole. The male screw portion 273 of the pivot adjusting member 269 is screwed to the female screw portion.

A fixing nut 275 is screwed to an outer side of the male screw portion 273, and after adjusting a position of an inner side of a front end of the canceling expansion portion 274 by rotating the male screw portion 273, the male screw portion 273 is stopped from being loosened by the fixing nut 275. The canceling expansion portion 274 is fitted with a seal ring comprising an elastic member of rubber or the like to prevent dust and dirt of mud water or the like from invading from outside of the housing 251. The front end of the canceling expansion portion 274 is brought into contact with the engaging portion 268 of the roller holder 266 to restrict an attitude of the roller holder 266 (inclination around the rotating shaft 272). An amount of pushing the drive belt 260 by the tension roller 267 is determined by the attitude of the roller holder 266 and therefore, by adjusting an amount of screwing the pivot adjusting member 269, the tension of the drive belt 260 can be adjusted.

Although the housing 251 is normally constituted by a metal of aluminum or the like as a material thereof, the canceling expansion portion 274 comprises a material having a linear expansion coefficient different from that of the housing 251, for example, ceramics or the like having a linear expansion coefficient smaller than that of the material of the housing. Now, when the linear expansion coefficient of the housing 251 and the linear expansion coefficient of the canceling expansion portion 274 are respectively designated by notations $\alpha$ and $\beta$, a length of the canceling expansion portion 274, a distance between axis lines of the pivoting shaft 272 and the canceling expansion portion 274, and a distance between centers of the pivoting shaft 272 and the roller shaft 271 are respectively designated by notations L1, L2 and L3 (FIG. 25). Further, when an amount of moving the tension roller 267 necessary for canceling a variation of the belt tension by a change in temperature is designated by notation $\delta$, the amount can be represented by the following equation.

$$\delta = (\alpha - \beta) \times L1 \times (L3/L2)$$

Therefore, the necessary moving amount $\delta$ can be provided by selecting or setting the material (linear expansion coefficient $\beta$) of the canceling expansion portion 274, the length L1 of the canceling expansion portion 274, and a lever ratio (L3/L2) of the roller holder.

The belt speed reducing apparatus 257 and the electric power steering apparatus 250 integrated therewith according to the embodiment are operated as follows. When the handle (steering wheel) is operated, for example, the torque detecting apparatus 15b (refer to FIG. 1) provided between the steering wheel and the pinion 15a (refer to FIG. 1) detects rotation of the steering wheel. The assisting motor 254 is rotated by receiving the detecting signal and therefore, the drive pulley 258 is rotated, and the rotation is transmitted to the driven pulley 259 via the drive belt 260. Rotation of the driven pulley 259 is transmitted to the nut 253 via the spline coupling.

The nut 253 is supported by the bearing 256 unmovably in the axial direction, also the rack axis 252 is unrotatable and therefore, the rack shaft 252 per se is moved upwardly or downwardly in view from FIG. 23. Rotation of the rack shaft 252 rotates the pinion 15a to move the rack shaft 252 in a direction of reducing the above-described torque. The movement is simultaneously transmitted to the steering apparatus of the main body of the automobile and therefore, an advancing direction of the automobile is changed.

An initial tension of the drive belt 260 is adjusted by adjusting the tension adjusting mechanism 261, that is, the amount of screwing the pivot adjusting member 269. Even when temperature of the belt speed reducing apparatus 257 is elevated by running the automobile, the position of the tension roller 267 is automatically adjusted by a difference between the linear expansion coefficients of the canceling expansion portion 274 and the housing 251 and the tension of the drive belt is maintained substantially to a constant value.

Further, an elastic member of a spring or the like is not used in the tension adjusting mechanism 261 and therefore, even when a direction of rotating the driven pulley 259 is changed, a position of the tension roller 267 is not influenced by the rotational direction. Therefore, in the electric power steering apparatus 250 integrated therewith, even when a direction of turning the steering wheel is changed, a driver does not feel the deterioration in the feeling explained previously, that is, a feeling as if the steering wheel were caught by something owing to the delay in transmission. Further, an increase in the tension of the drive belt accompanied by temperature rise of the housing caused by not using the elastic member is canceled by the tension adjusting mechanism and therefore, power transmission is not hampered thereby.

Fourteenth Embodiment

Next, a belt speed reducing apparatus for an electric power steering apparatus and the electric power steering apparatus according to a fourteenth embodiment of the invention will be explained in reference to FIG. 26 and FIG. 27.

A point of difference of the electric power steering apparatus 280 according to the fourteenth embodiment from the thirteenth embodiment resides in that whereas the pivoting shaft 272 of the roller holder 266 of the thirteenth embodiment is axially supported directly by the housing 251, according to the fourteenth embodiment, the pivoting shaft 272 is supported by the shaft supporting frame 281. The other constitution is the same as that of the thirteenth embodiment and therefore, the same members are attached with the same notations and a detailed explanation thereof will be omitted.

Figure 26:
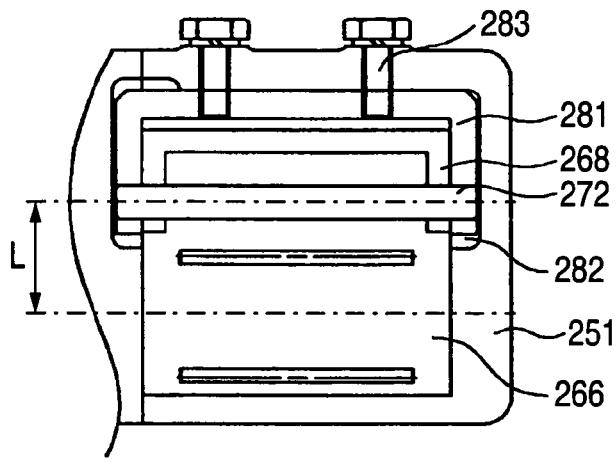
FIG. 26 is a view enlarging an essential portion taken along a line XXVI-XXVI☐ of FIG. 27 for explaining a shaft supporting frame of a fourteenth embodiment of the invention.
Figure 27:
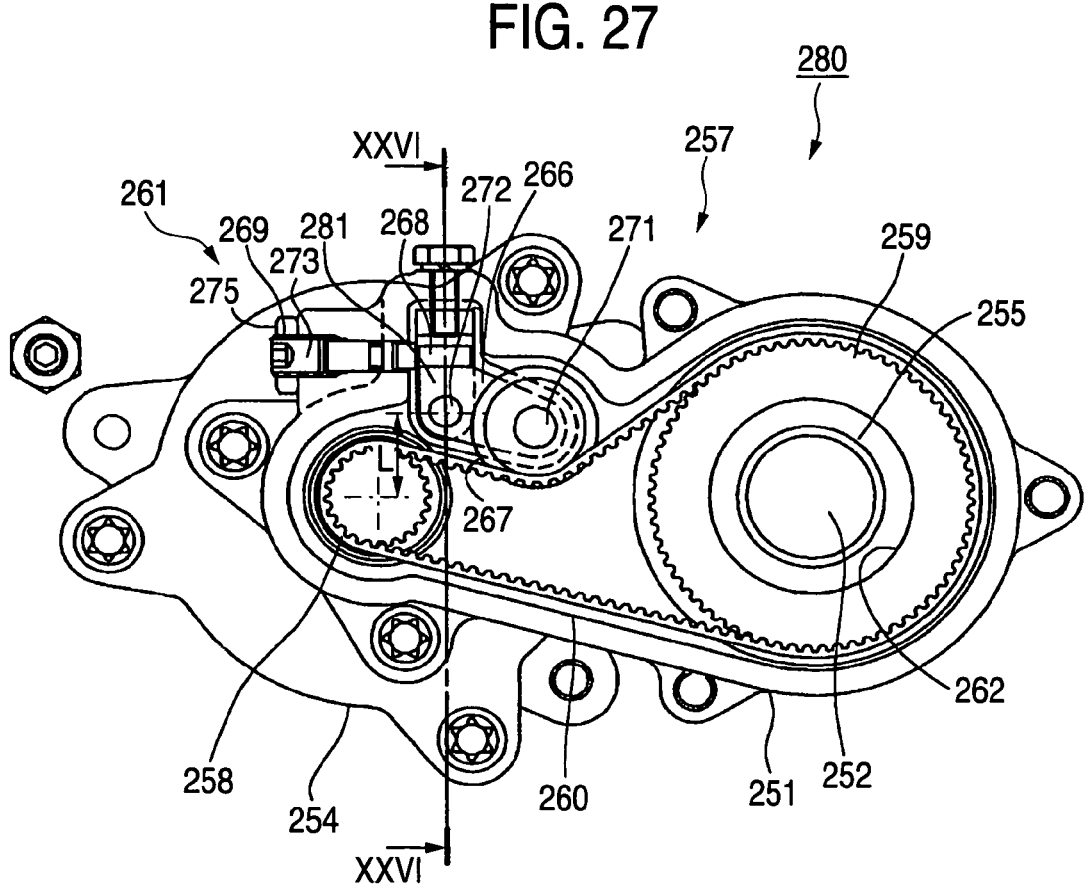
FIG. 27 is a sectional view of the fourteenth embodiment in correspondence with FIG. 24.

As shown by FIG. 26 and FIG. 27, the shaft supporting frame 281 is constituted by a C-shape and is fixed at inside of an inner recess portion 282 of the housing by a fixing screw 283. The pivoting shaft 272 is axially supported by two pieces of legs of the shaft supporting frame 281.

The shaft supporting frame 281 per se constitutes a canceling expansion portion and is constituted by a material of ceramics or the like having a linear expansion coefficient different from that of the housing 251. The ceramics of the shaft supporting frame 281 is not thermally expanded as much as the housing 251 even when temperature of the housing 251 is elevated and therefore, a distance L between the pivoting shaft 272 and the drive pulley 258 is relatively increased. Also the roller shaft 271 is move in cooperation with the pivoting shaft 272 and therefore, a change in the tension by temperature can be canceled. Further, although the pivot adjusting member 269 may be provided with the canceling expansion portion 274 similar to the thirteenth embodiment, the canceling expansion portion 274 can be integrated with male screw portion 281 by material the same as that of the male screw portion 281.

An elastic member such as a spring is not used in the tension adjusting mechanism 261 and a shaft supporting frame 281 similar to the thirteenth embodiment and therefore, even when the direction of rotating the driven pulley 259 is switched the position of the tension roller 267 is not influenced by the rotational direction. Therefore, according to the electric power steering apparatus 280 integrated therewith, even when the direction of turning the steering wheel is changed, a driver does not feel the previously explained deterioration of feeling, that is, the feeling as if the steering wheel were caught by something owing to the delay in transmission. Further, the increase in the tension of the drive belt accompanied by temperature rise of the housing caused by not using the elastic member is canceled by the tension adjusting mechanism and therefore, power transmission is not hampered thereby.

Fifteenth Embodiment

Figure 28:
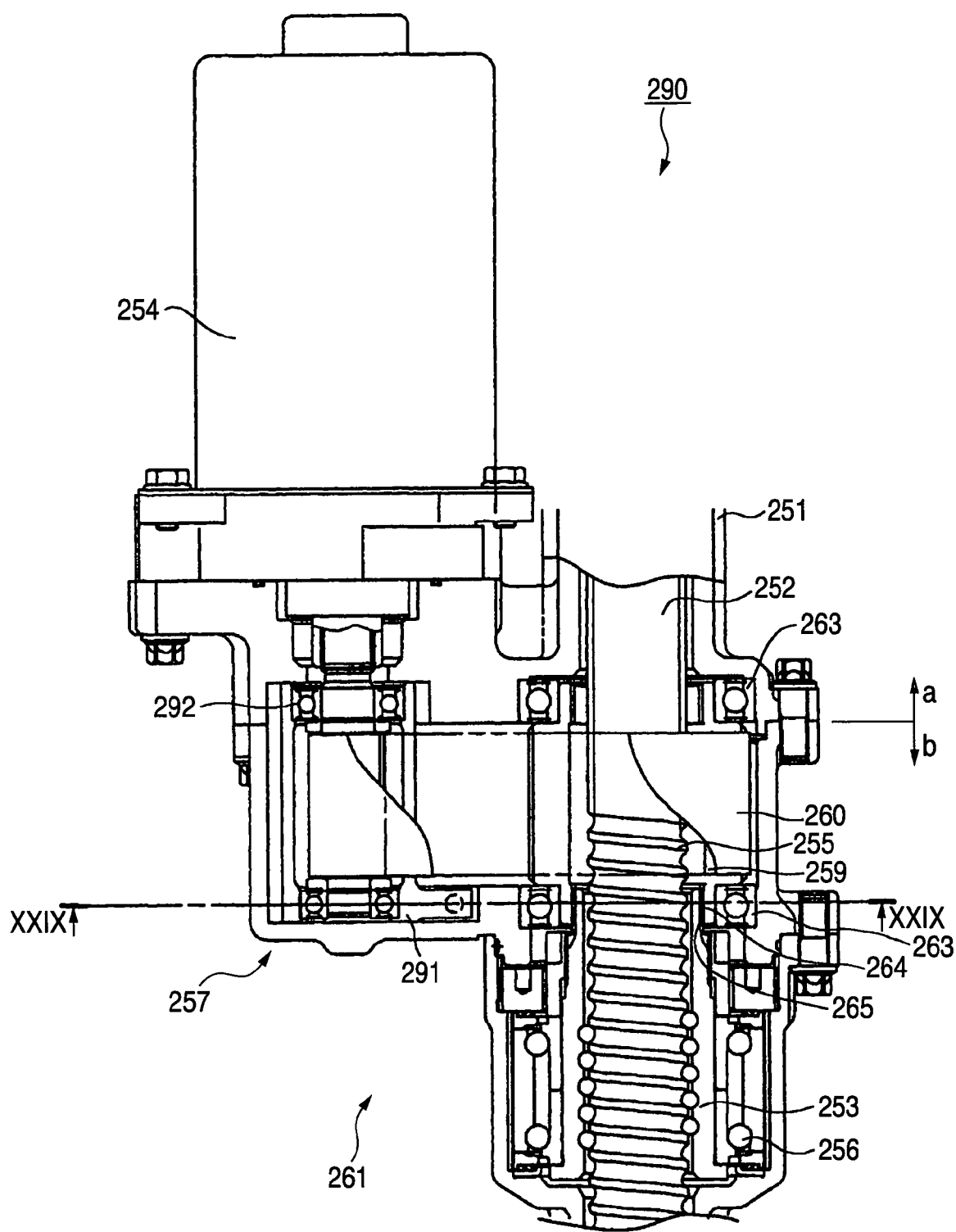
FIG. 28 is a sectional view of an essential portion showing a fifteenth embodiment of the invention.
Figure 29:
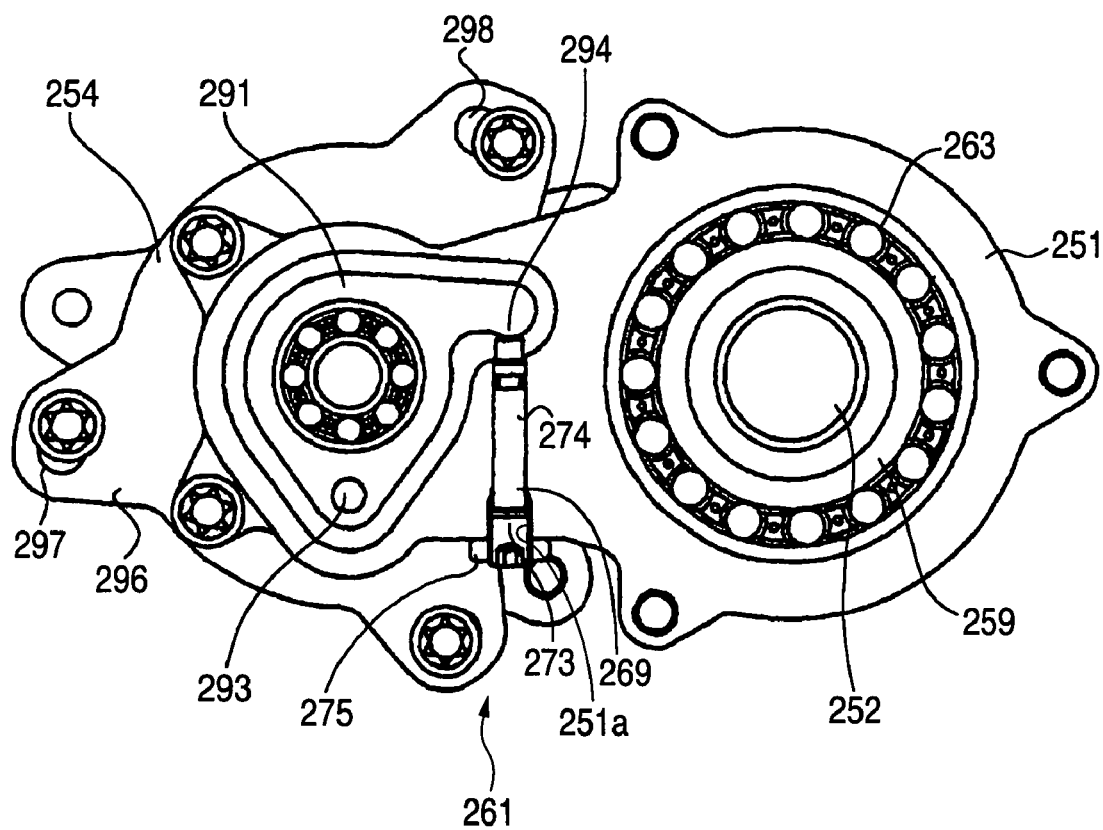
FIG. 29 is a sectional view of taken along line XXIX-XXIX of FIG. 28.

Next, a belt speed reducing apparatus for an electric power steering apparatus and the electric power steering apparatus according to a fifteenth embodiment of the invention will be explained in reference to FIG. 28 and FIG. 29.

According to the thirteenth embodiment and the fourteenth embodiment, the belt tension is adjusted by pivoting the roller holder 266 by the tension adjusting mechanism 261 and pressing the tension roller 267 provided at the roller holder 266 to the derive belt 260. Meanwhile, according to the electric power steering apparatus 290 of the embodiment, the tension adjusting mechanism 261 is not provided with the roller holder 266 and the tension roller 267 but adjusts the tension of the drive belt 260 by changing the position of the drive pulley 258. The other constitution is the same as those of the thirteenth and fourteenth embodiments and therefore, the same members are attached with the same notations and a detailed explanation thereof will be omitted.

The assisting motor 254 and the drive pulley 258 are supported by a pulley holder 291. The pulley holder 291 is provided with substantially an L-like shape and is provided with a pulley bearing 292 supporting the drive pulley 258 at a vicinity of at the center square portion. One of two legs of the pulley holder 291 is supported by a pivoting shaft 293 to make the pulley holder 291 pivotable and other leg is formed with an engaging portion 294.

Similar to the thirteenth embodiment and the fourteenth embodiment, the pivoting adjusting member 269 is an axial pivoting member and is provided with the pivot adjusting male screw portion 273 at the root portion and the canceling expansion portion 274 on the front end side. The housing 251 (lower portion b) is formed with a through hole from outside to the engaging portion 294, and a pivot adjusting female screw portion 251*a* is formed at a vicinity of an outer side opening portion of the through hole. The male screw portion 273 of the pivot adjusting member 269 is screwed to the female screw portion 251*a*.

A fixing nut 275 is screwed to the outer side of the male screw portion 273 and after adjusting the position of the inner side of the front end of the canceling expansion portion 274 by rotating the male screw portion 273, the canceling expansion portion 274 is stopped from being loosened by the fixing nut 275. The canceling expansion portion 274 is fitted with the seal ring comprising the elastic member of rubber or the like to prevent dust and dirt of mud water or the like from invading from outside of the housing 251. The front end of the canceling expansion portion 274 is brought into contact with the engaging portion 294 of the pulley holder 291 to restrict the attitude of the pulley holder 291 (inclination around the pivoting shaft 293). The position of the drive pulley 258 differs by the attitude of the pulley holder 291 and therefore, the tension of the drive belt 260 can be adjusted by adjusting the mount of screwing the pivot adjusting member 269.

An attaching plate 296 of the assisting motor 254 is provided with circular arc holes 297 and 298 centering on the pivoting shaft and is lightly supported to permit to pivot the assisting motor 254 and the drive pulley 258 slightly by bolts passing the circular arc holes 297 and 298.

When temperature of the electric power steering apparatus 290 is elevated, the distance between the axis centers of the drive pulley 258 and the driven pulley 259 is increased, and the housing 251 is expanded in the direction of increasing the tension, since an amount of expanding the canceling expansion portion 274 is smaller than the amount of expanding the housing 251, the pulley holder 291 is inclined in the clockwise direction around the pivoting shaft 293. Therefore, the drive pulley 258 is moved to be proximate to the side of the driven pulley 259. The tension of the drive belt 260 is loosened thereby and therefore, above-described amount of increasing the tension is canceled thereby. That is, the tension of the drive belt 260 is maintained to be automatically constant.

Also in the embodiment, an elastic member for maintaining the tension of the drive belt 260 constant is not used and therefore, rotation from the assisting motor 254 is transmitted to the drive pulley 259 without delay. Therefore, according to the electric power steering apparatus 290 integrated therewith, a driver does not feel the above-described deterioration in feeling, that is, feeling as if the steering wheel is caught by something owing to the delay in transmission even when the direction of turning the steering wheel is changed.

Sixteenth Embodiment

Figure 30:
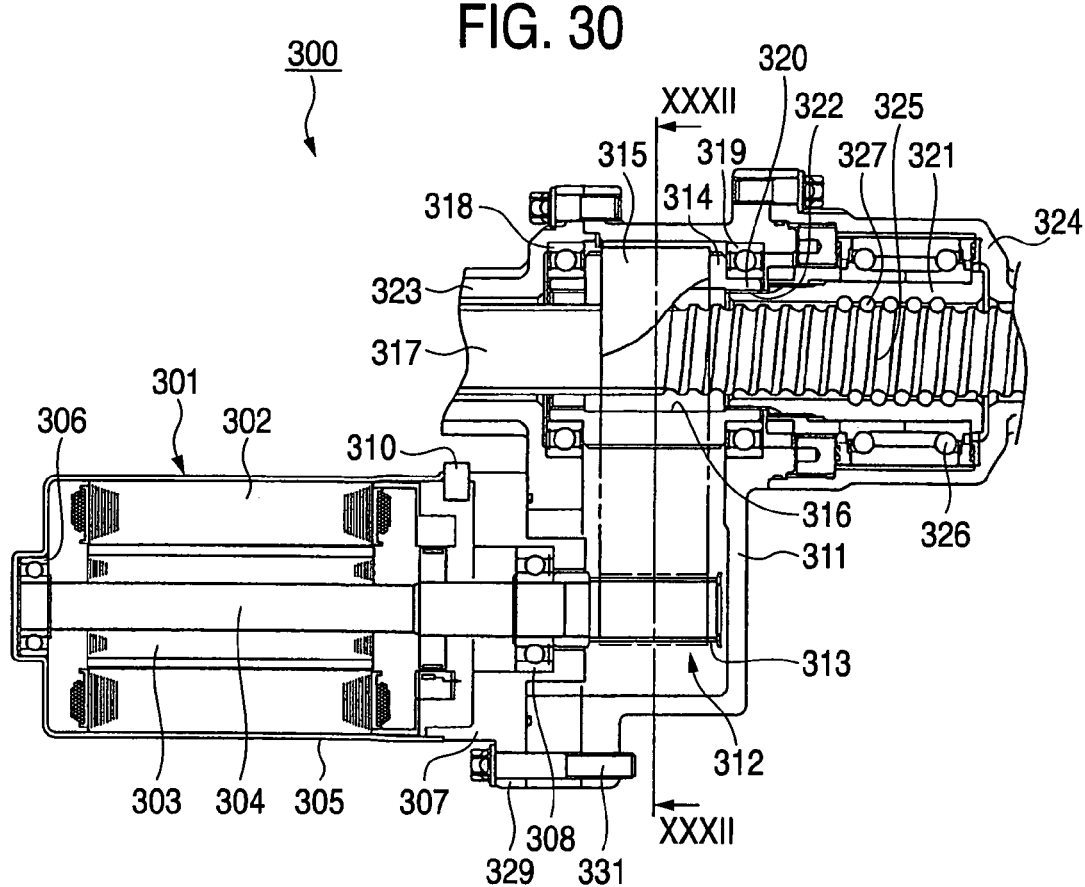
FIG. 30 is a sectional view of an essential portion showing a sixteenth embodiment of the invention.

Next, an electric power steering apparatus according to a sixteenth embodiment of the invention will be explained in reference to FIG. 30 and FIG. 32.

In the power steering apparatus 300 of the embodiment, the assisting motor 301 is provided with a stator 302 and a rotor 303, and a motor shaft 304 fixed to the rotor 303 is rotatably supported by a bearing 306 held by a motor housing 305 and a bearing 308 held by the motor flange 307.

Figure 31:
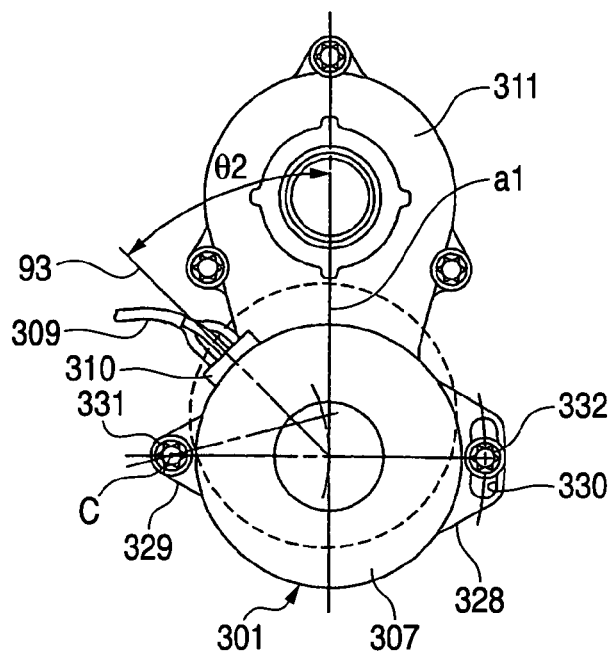
FIG. 31 is a left side view of FIG. 30.

As shown by FIG. 31, the motor housing 305 is provided with the harness take out port 310 from which an electric wire 309 electrically connected to the stator 302 is drawn to outside, and the drawn electric wire 309 is connected to a control circuit, not illustrated.

Further, the motor shaft 304 is extended from the bearing 308 to inside of a gear housing 311, and a front end portion thereof is integrally provided with the drive pulley 313 constituting a belt speed reducing apparatus 312.

The belt speed reducing apparatus 312 is provided with the drive pulley 313, the driven pulley 314, and the drive belt 315 at inside of the gear housing 311. The drive belt 315 is hung over between the drive pulley 313 provided at the motor shaft 304 of the assisting motor 301 and the driven pulley 314 supported by the gear housing 311 rotatably and unmovably in an axial direction to transmit rotation of the assisting motor 301 to the driven pulley 314. Further, the drive pulley 313 and the driven pulley 314 are formed with teeth brought in mesh with teeth formed on an inner side of the drive belt 315.

The driven pulley 314 is provided with the through hole 316, and a rack shaft 317 penetrates the through hole 316. The driven pulley 314 is supported by two bearings 318 and 319 rotatably and unmovably in the axial direction relative to the gear housing 311. Further, a spline groove 320 is formed on one side of the driven pulley 314 and the spline groove 320 and a spline projected streak 322 formed at a nut 321 are subjected to a spline coupling. By the spline coupling, only rotation of the driven pulley 314 is transmitted to the nut 321.

The rack shaft 317 is held at inside of a housing constituted by the gear housing 311 and rack shaft housings 323 and 324 unrotatably and movably in the axial direction. The rack shaft 317 is provided with a male screw portion 325 constituting a ball screw mechanism along with the rack portion 21 (refer to FIG. 1) having a rack teeth with which the pinion rotated by the steering wheel is brought in mesh.

The nut 321 is supported by a bearing 326 rotatably and unmovably in the axial direction relative to the housing. A circulating ball 327 is interposed between a female screw portion formed at an inner peripheral face of the nut 321 and the male screw portion 325 to thereby constitute a ball screw mechanism. Therefore, when the assisting motor 301 is rotated, a driving rotational force is transmitted to the nut 321 via the belt speed reducing apparatus 312, thereby, the rack shaft 317 is moved in the axial direction.

As shown by FIG. 31, in the motor flange 307, a pair of flanges 328 and 329 are opposedly arranged on a side thereof of attaching to the gear housing 311, and one flange 328 of the pair of flanges 328 and 329 is formed with a long hole 330 prolonged in a circumferential direction of the motor flange 307. Therefore, by inserting the bolt 331 through other flange 329 to screw to the gear housing 311 and inserting the bolt 332 through the long hole 330 of one flange 328 to screw to the gear housing 311, the motor flange 307 is made to be pivotable by constituting a fulcrum C by the bolt 331. By pivoting the motor flange 307 centering on the fulcrum C, a distance between axis centers of the drive pulley 313 and the driven pulley 314 can be changed and therefore, adjustment of the tension of the drive belt 315 can simply be carried out. Further, by using the bolt 331 as the fulcrum C, an inexpensive tension adjusting mechanism can be constituted without increasing a number of parts. Further, although the flange 329 and the bolt 331 of the motor flange 307 is arranged in a side direction of the drive pulley 313 as shown by FIGS. 31 and 32, in FIG. 30, the flange 329 and the bolt 331 are shown on a lower side of the drive pulley 313 for convenience of explanation.

Figure 32:
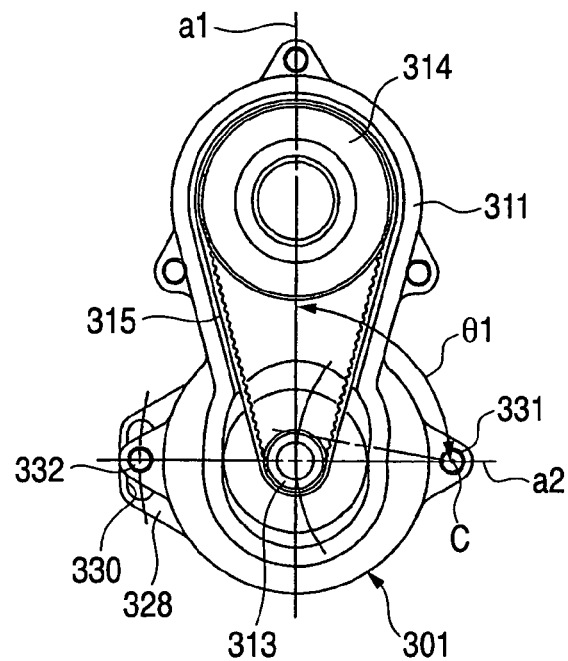
FIG. 32 is a sectional view taken along a line XXXII-XXXII of FIG. 30.

As shown by FIG. 32, the fulcrum C is arranged at the position at which an angle θ1 made by a line a1 connecting the axis centers of the drive pulley 313 and the driven pulley 314 and a line a2 connecting the axis center of the drive pulley 313 and the fulcrum C is made to be equal to or smaller than 90 degrees. The fulcrum C is set to the angle θ1 equal to or smaller than 90 degrees between the line a1 and the line a2 for enabling to effectively change the distance between the axis centers of the drive pulley 313 and the driven pulley 314 for a small pivoting angle of the assisting motor 301. The constitution conversely achieves an effect of capable of setting to reduce a movable region of the assisting motor 301.

Further, according to the harness take out port 310, an angle θ2 made by the line a1 connecting the axis centers of the drive pulley 313 and the driven pulley 314 and a line a3 connecting the axis center of the drive pulley 313 and the harness take out port 310 is set to be equal to or smaller than 90 degrees. The harness take out port 310 is set with the angle θ2 equal to or smaller than 90 degrees between the line a1 and the line a3 because the drive belt 315 is provided with a dimensional error in view of fabrication thereof. Therefore, after adjusting the tension, more or less individual difference is produced in the position of the assisting motor 301, and when the harness take out port 310 in a projected shape is arranged at a position at which there is a concern of interfering with accessories of a vehicle body, particularly at inside of an engine room, the position is disadvantageous in view of layout. Therefore, by setting the position as described above, layout performance can be promoted by arranging the harness take out port 310 such that the harness take out port 310 is not extruded.

Figure 33:
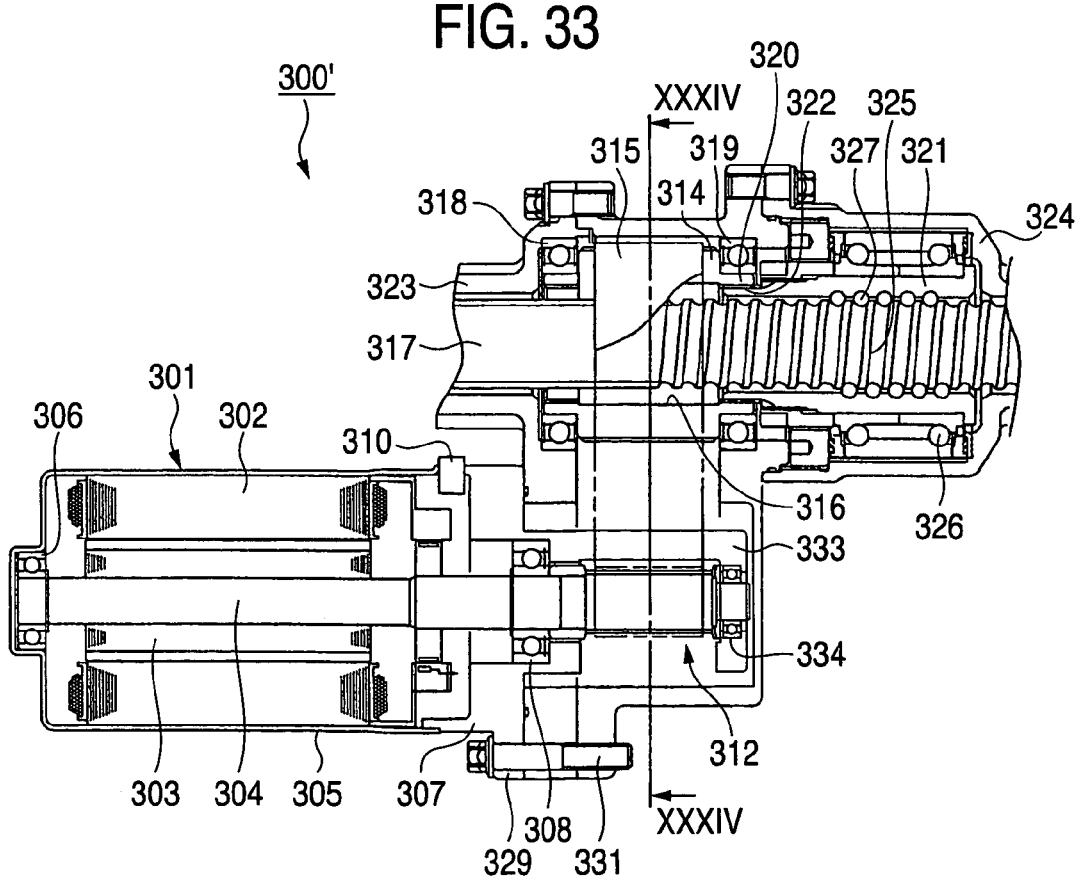
FIG. 33 is a sectional view of an essential portion showing a modified example of the sixteenth embodiment of the invention.
Figure 34:
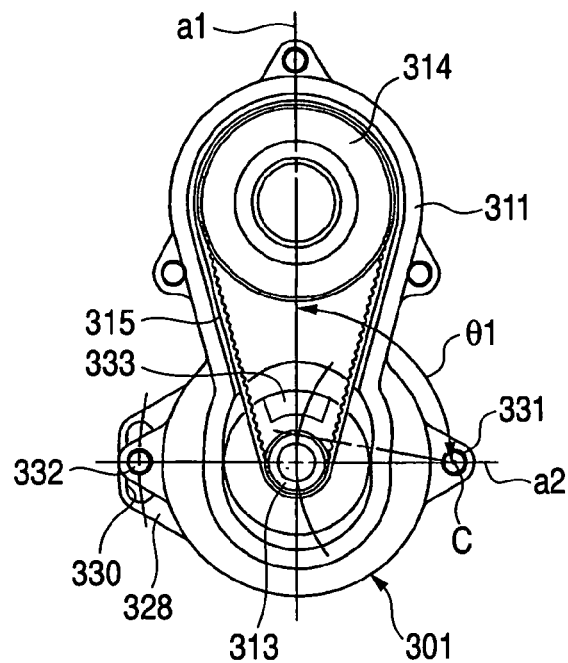
FIG. 34 is a sectional view taken along a line XXXIV-XXXXIV of FIG. 33.

Further, although according to the embodiment, the drive pulley 313 integrally provided with the motor shaft 304 is supported in the form of a cantilever, as shown by an electric power steering apparatus 300' of FIG. 33 and FIG. 34, there may be constructed a constitution in which an extended portion 333 is formed by extending one end side of the motor flange 307 and both ends of the drive pulley 313 are supported by rolling bearings 308 and 334.

Seventeenth Embodiment

Figure 35:
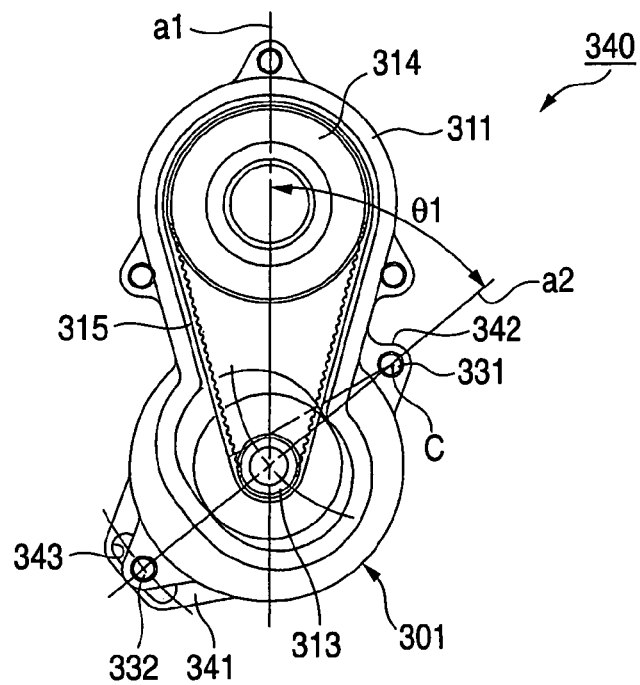
FIG. 35 is a sectional view of a seventeenth embodiment in correspondence with FIG. 32.

Next, an electric power steering apparatus according to a seventeenth embodiment of the invention will be explained in reference to FIG. 35. Further, portions equivalent to those of the sixteenth embodiment are attached with the same rotations and an explanation thereof will be omitted or simplified.

According to the electric power steering apparatus 340, a position of the flange 342 constituting the fulcrum C in a pair of flanges 341 and 342 provided at the motor flange 307 is disposed on a side of the driven pulley 314, and the fulcrum C is arranged at the position at which the angle θ1 made by the line a1 connecting the axis centers of the drive pulley 313 and the driven pulley 314 and the line a2 connecting the axis center of the drive pulley 313 and the fulcrum C is made to be equal to or smaller than 90 degrees. Further, a flange 341 having a long hole 343 is provided on a side opposed to the fulcrum C relative to the axis center of the drive pulley 313.

Since the drive belt 315 includes a core wire constituted by glass fiber, the constitution is for dealing with a delicate variation of the tension with respect to a small variation in the distance between the axis centers, thereby, adjustment of the tension can be facilitated by making a variation in the distance between the axis centers of the drive pulley 313 and the driven pulley 314 with respect to the pivoting angle of the assisting motor 301 insensitive. Further, since the fulcrum C is arranged at the position at which the angle θ1 becomes equal to or smaller than 90 degrees, by ensuring a large amount of moving the interval between the axis centers relative to the pivoting angle of the assisting motor 301, integration performance can be improved.

The other constitution and operation are similar to those of the sixteenth embodiment.

Eighteenth Embodiment

Figure 36:
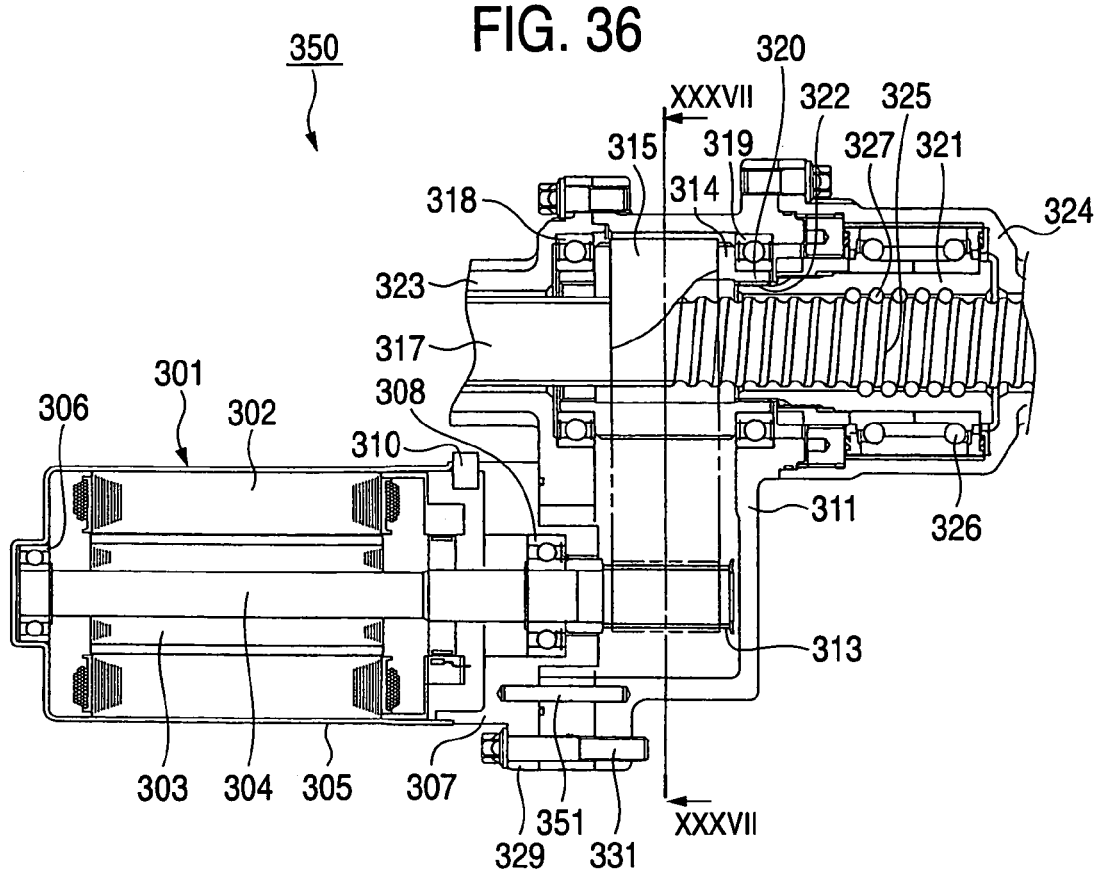
FIG. 36 is a sectional view of an essential portion showing an eighteenth embodiment of the invention.
Figure 37:
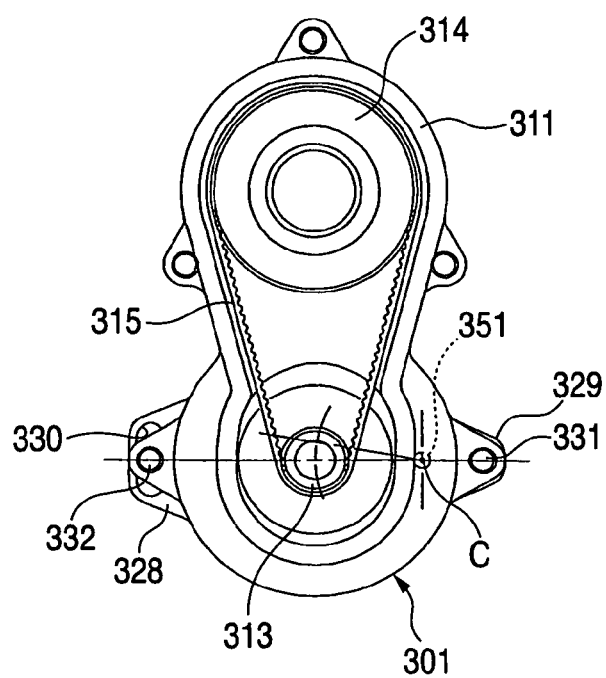
FIG. 37 is a sectional view taken along a line XXXVII-XXXVII of FIG. 36.

Next, an electric power steering apparatus according to a seventeenth embodiment of the invention will be explained in reference to FIG. 36 and FIG. 37. Further, portions equivalent to those of the sixteenth embodiment are attached with the same notations and an explanation thereof will be omitted or simplified.

In the electric power steering apparatus 350, a shaft ember 351 is fitted to the motor flange 307 and the gear housing 11, and the motor flange 307 is pivoted by constituting the fulcrum C by the shaft member 351. In this case, since the fulcrum C is not constituted by the bolt 331 as in the sixteenth embodiment and the seventeenth embodiment, phases of the flanges 328 and 329 can freely be set and therefore, the flanges 328 and 329 can be arranged at positions avoiding interference with the vehicle body. Further, although the flange 329 of the motor flange 307 is arranged in a side direction of the drive pulley 313 as shown by FIG. 37, in FIG. 36, the flange 329 is shown on the lower side of the drive pulley 313 for convenience of explanation.

The other constitution and operation are similar to those of the sixteenth embodiment.

Nineteenth Embodiment

Figure 38:
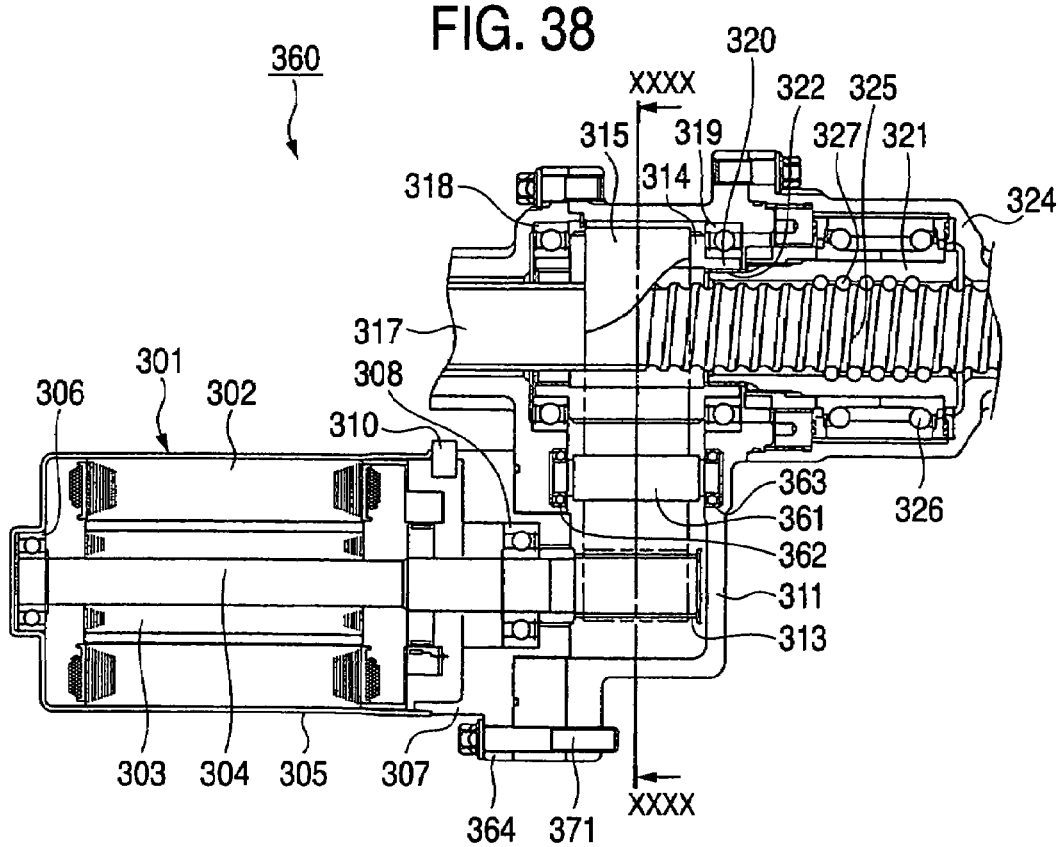
FIG. 38 is a sectional view of an essential portion showing a nineteenth embodiment of the invention.

Next, an electric power steering apparatus according to a nineteenth embodiment of the invention will be explained in reference to FIG. 38 through FIG. 40. Further, portions equivalent to those of the sixteenth embodiment are attached with the same notations and an explanation thereof will be omitted or simplified.

In the electric power steering apparatus 360, the idler pulley 361 is rotatably integrated between the drive pulley 313 and the drive pulley 314 of the gear housing 311 by bearings 362 and 363. Further, the motor flange 307 is provided with three flange portions 364, 365, and 366, and the two flanges 365 and 366 are formed with long holes 367 and 368 prolonged in the circumferential direction of the motor flange 307. By inserting bolts 369 and 370 through the long holes 367 and 368 of the two flanges 365 and 366 to screw to the gear housing 311, the motor flange 307 is made to be pivotable by constituting the fulcrum C by a bolt 371.

Figure 39:
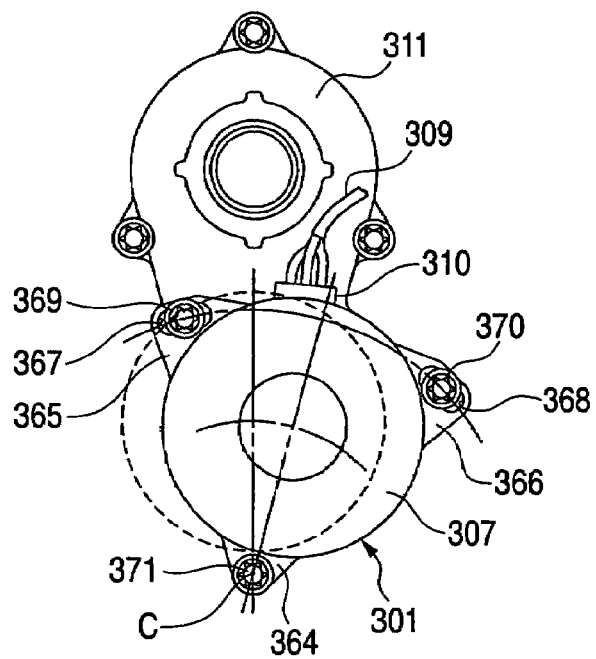
FIG. 39 is a left side view of FIG. 38.

The idler pulley 361 is brought into contact with an outer peripheral portion of the drive belt 315 and is arranged to be able to adjust the tension even when a direction of moving the drive pulley 313 by pivoting the assisting motor 301 is a horizontal direction of FIG. 39, which is inefficient in adjusting the distance between the axis centers. Further, the idler pulley 361 is small-sized and arranged at a position at which an angle of the idler pulley 361 made to wrap on the drive belt 315 is increased and therefore, the durability of the drive belt 315 can be promoted.

Figure 40:
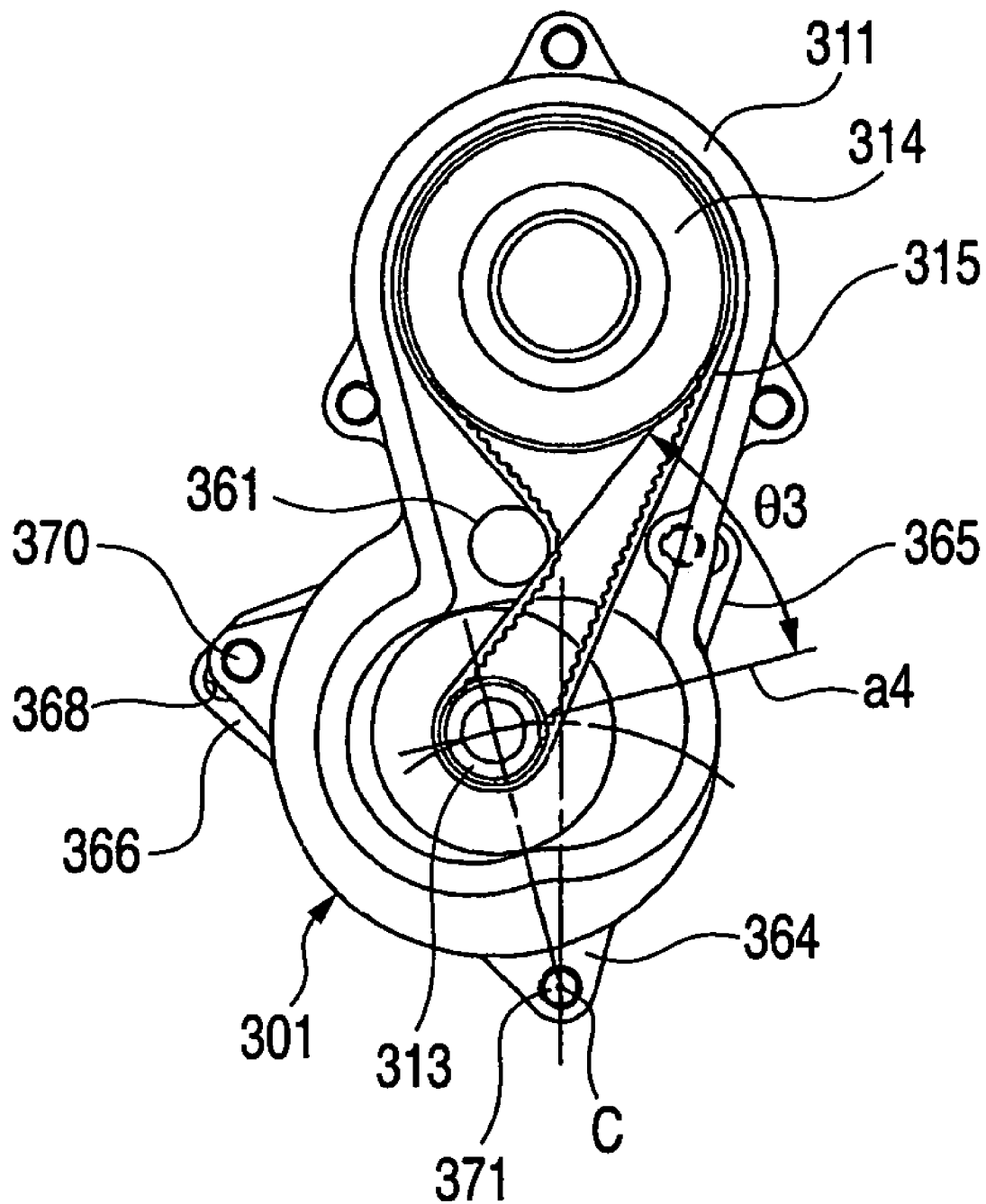
FIG. 40 is a sectional view taken along a line XXXX-XXXX of FIG. 38.
Figure 41:
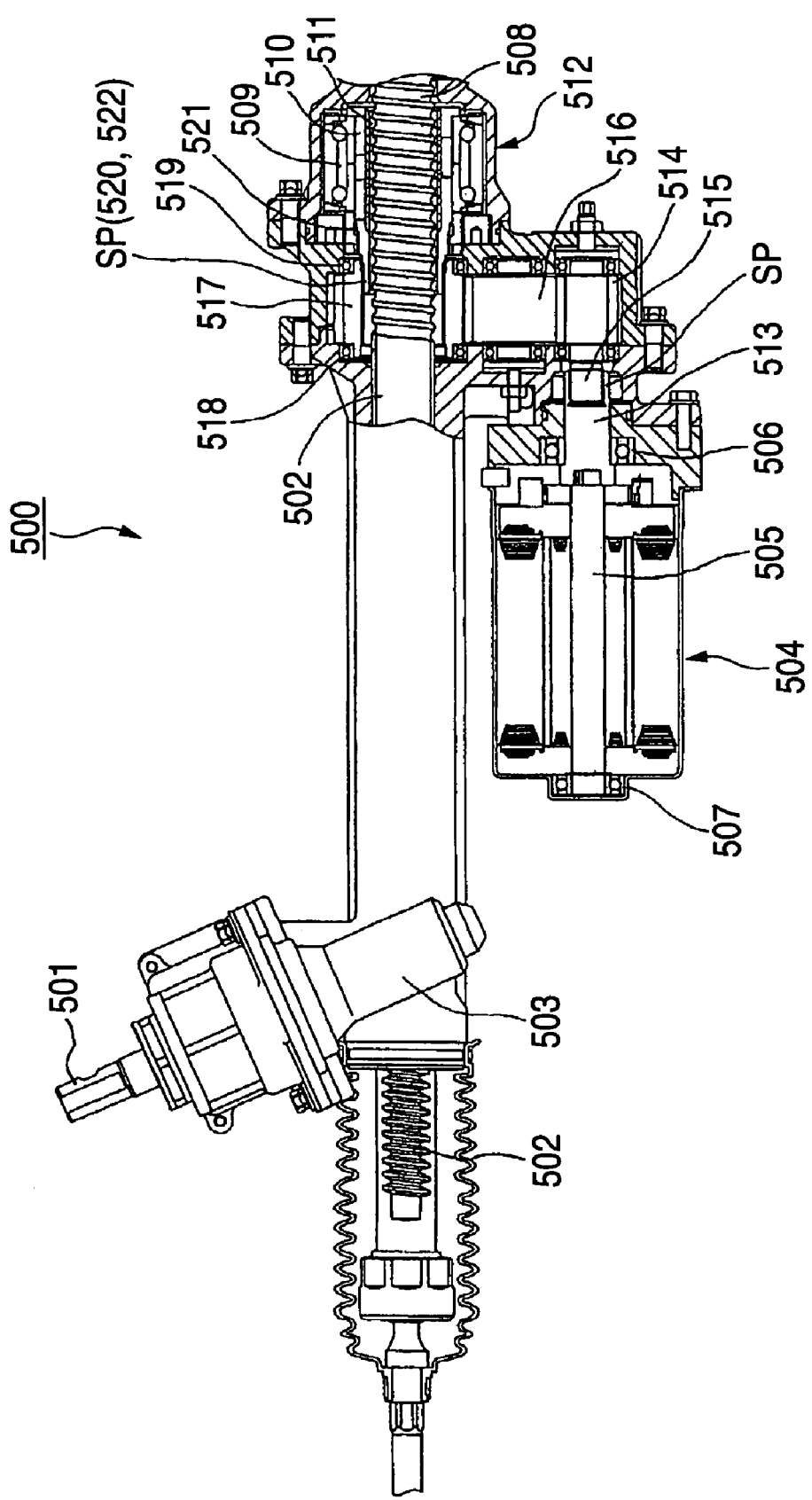
FIG. 41 is a cross-sectional view for explaining a constitution of an essential portion of an electric power steering apparatus of a related art.

Further, as shown by FIG. 40, the idler pulley 361 is disposed such that an angle θ3 made by the drive belt 315 from the drive pulley 313 pressed by the idler pulley 361 and a tangential line a4 of a locus of moving the drive pulley 313 becomes small and therefore, the tension can effectively be exerted to the drive belt 315 even for small movement of the drive pulley 313.

Although an explanation has been given of the invention in details and in reference to the specific embodiments, it is apparent for the skilled person that the invention can variously be changed or modified without deviating from the spirit and the range of the invention.

The belt speed reducing apparatus for the electric power steering apparatus and the electric power steering apparatus capable of reducing operating sound without making layout difficult and giving an excellent steering wheeling can be provided.

What is claimed is:

1. A belt speed reducing apparatus for an electric power steering apparatus, said speed reducing apparatus comprising:
   a drive pulley having a first helical gear and supported to be able to drive to rotate;
   a driven pulley having a second helical gear and rotatably supported; and
   a drive belt hung over the drive pulley and the driven pulley and having helical teeth brought in mesh with the first and the second helical gears;
   wherein a relationship of tan β<μ is established between a twist angle β of the respective helical gears and a friction coefficient μ between the first or the second helical gear and the helical teeth of the drive belt.

2. The belt speed reducing apparatus according to claim 1, further comprising a pair of flanges provided on respective sides of one of the drive pulley and the driven pulley, wherein the drive belt is arranged between the pair of flanges.

3. An electric power steering apparatus comprising: a housing;
   a rack shaft supported by the housing movably in an axial direction and to be hampered from being rotated;
   a rack portion provided at the rack shaft;
   a male screw portion provided at the rack shaft;
   a nut constituting a ball screw mechanism by being screwed to the male screw portion via a ball;
   a drive pulley having a first helical gear and rotatably supported;
   a driven pulley coupled to the nut with regard to rotation thereof, having a second helical gear and rotatably supported;
   a drive belt hung over between the drive pulley and the driven pulley and having helical teeth to be able to be brought in mesh with the first and the second helical gears;
   an assisting motor for driving the drive pulley;
   a pinion brought in mesh with rack teeth of the rack portion;
   an input shaft inputted with a steering force from a steering wheel; and
   a torque detecting apparatus for detecting a torque applied to the pinion by the input shaft;
   wherein a relationship of tan β<μ is established between a twist angle β of the respective helical gears and a friction coefficient μ between the first or the second helical gear and the helical teeth of the drive belt.

4. The electric power steering apparatus according to claim 3, further comprising a pair of flanges provided on respective sides of one of the drive pulley and the driven pulley, wherein the drive belt is arranged between the pair of flanges.

5. The electric power steering apparatus according to claim 3, wherein the housing comprises a right housing and a left housing which are distinct from each other, wherein the assisting motor is provided at the left housing, the driven pulley is supported by the right and left housings, and the nut is disposed inside the right housing.

6. The electric power steering apparatus according to claim 3, wherein the nut is rotatably supported inside the housing.

* * * * *